(12) United States Patent
Becker

(10) Patent No.: US 7,756,077 B2
(45) Date of Patent: *Jul. 13, 2010

(54) REQUEST SIGNAL DESIGNS FOR MULTIPLE SERVICE TYPES

(75) Inventor: Donald W. Becker, Rancho Sante Fe, CA (US)

(73) Assignee: ViaSat, Inc., Carlsbad, CA (US)

( * ) Notice: Subject to any disclaimer, the term of this patent is extended or adjusted under 35 U.S.C. 154(b) by 340 days.

This patent is subject to a terminal disclaimer.

(21) Appl. No.: 11/771,840

(22) Filed: Jun. 29, 2007

(65) Prior Publication Data

US 2008/0187002 A1    Aug. 7, 2008

Related U.S. Application Data

(60) Provisional application No. 60/895,143, filed on Mar. 16, 2007, provisional application No. 60/888,451, filed on Feb. 6, 2007.

(51) Int. Cl.
*H04W 4/00* (2009.01)
*H04W 24/00* (2009.01)
*G06F 15/16* (2006.01)
*H04L 12/56* (2006.01)

(52) U.S. Cl. ............... 370/328; 370/337; 370/390; 370/348; 370/412; 370/442; 455/423; 455/442; 455/561; 709/223; 709/225; 709/249

(58) Field of Classification Search ......... 372/229–503; 455/561, 423, 442; 709/223, 249, 225
See application file for complete search history.

(56) References Cited

U.S. PATENT DOCUMENTS

| | | | |
|---|---|---|---|
| 4,774,707 A | 9/1988 | Raychaudhuri | |
| 5,239,677 A | 8/1993 | Jasinski | |
| 5,592,469 A | 1/1997 | Szabo | |
| 5,669,062 A | 9/1997 | Olds et al. | |

(Continued)

FOREIGN PATENT DOCUMENTS

EP    0282028 A2    9/1988

(Continued)

OTHER PUBLICATIONS

Asgarkhani et al; "Simulation Studies of Mixed Traffic on Satellite Channels Using TDMA-Reservation Protocol" Proceeding of the Annual International Phoenix Conference on Computers and Communications; Mar. 22, 1989; pp. 195-200; Washington, US.

(Continued)

*Primary Examiner*—Ayaz R Sheikh
*Assistant Examiner*—Venkatesh Haliyur
(74) *Attorney, Agent, or Firm*—Townsend and Townsend and Crew LLP

(57) ABSTRACT

Methods and apparatuses are presented for conducting communications over a shared communication medium involving a plurality of nodes, involving (a) sending a request from a first node, the shared communication medium organized to include a request signal space and a scheduled transmission signal space, the request signal space including request segments each having a different location within the request signal space, the scheduled transmission signal space including scheduled transmission segments each having a different location within the scheduled transmission signal space, the request sent in a request segment, (b) obtaining an assignment associating the request with a scheduled transmission segment, taking into account location of the request within the request signal space, (c) from the first node, sending a data transmission in the scheduled transmission segment associated with the request, and (d) wherein the plurality of scheduled transmission segments include multiple categories of scheduled transmission segments associated with different service types.

26 Claims, 17 Drawing Sheets

U.S. PATENT DOCUMENTS

| | | | |
|---|---|---|---|
| 5,737,335 A | | 4/1998 | Mizuta et al. |
| 6,034,967 A | | 3/2000 | Citta et al. |
| 6,332,006 B1 | * | 12/2001 | Rydbeck et al. ............. 375/262 |
| 6,563,808 B1 | | 5/2003 | Cox et al. |
| 6,567,661 B2 | * | 5/2003 | McDonnell et al. ....... 455/426.1 |
| 6,584,101 B2 | | 6/2003 | Hagglund et al. |
| 6,590,885 B1 | * | 7/2003 | Jorgensen .................. 370/338 |
| 6,677,864 B2 | * | 1/2004 | Khayrallah .................. 341/50 |
| 6,680,929 B1 | * | 1/2004 | Iida et al. .................... 370/348 |
| 6,738,350 B1 | | 5/2004 | Gao et al. |
| 6,760,591 B1 | | 7/2004 | Klinger |
| 6,847,626 B1 | * | 1/2005 | Carneal et al. .............. 370/345 |
| 6,850,499 B2 | * | 2/2005 | Wheatley et al. ............ 370/328 |
| 6,985,455 B1 | | 1/2006 | Heath et al. |
| 7,113,780 B2 | * | 9/2006 | McKenna et al. ........... 455/431 |
| 7,143,131 B1 | | 11/2006 | Soles et al. |
| 7,187,669 B1 | | 3/2007 | Lee |
| 7,330,487 B2 | * | 2/2008 | Chang et al. ................ 370/490 |
| 7,366,202 B2 | | 4/2008 | Scherzer et al. |
| 7,370,116 B2 | | 5/2008 | Chan et al. |
| 7,471,932 B2 | | 12/2008 | Wu et al. |
| 7,486,643 B2 | | 2/2009 | Czaja et al. |
| 7,515,580 B2 | * | 4/2009 | Wheatley et al. ............ 370/349 |
| 7,529,221 B2 | | 5/2009 | Czaja et al. |
| 7,657,628 B1 | * | 2/2010 | McDysan et al. ........... 709/225 |
| 2001/0045494 A1 | | 11/2001 | Higgins |
| 2002/0077141 A1 | | 6/2002 | Hwang et al. |
| 2002/0080816 A1 | | 6/2002 | Spinar et al. |
| 2002/0126711 A1 | | 9/2002 | Robinett et al. |
| 2002/0131376 A1 | * | 9/2002 | Wheatley et al. ............ 370/328 |
| 2002/0136276 A1 | * | 9/2002 | Franceschini et al. ....... 375/148 |
| 2003/0083095 A1 | | 5/2003 | Liang |
| 2003/0128687 A1 | | 7/2003 | Worfolk et al. |
| 2003/0147411 A1 | | 8/2003 | Goosman |
| 2003/0207684 A1 | | 11/2003 | Wesel |
| 2003/0223409 A1 | * | 12/2003 | Wiebe ........................ 370/352 |
| 2004/0142658 A1 | * | 7/2004 | McKenna et al. .......... 455/11.1 |
| 2004/0162099 A1 | | 8/2004 | Chen et al. |
| 2004/0218577 A1 | | 11/2004 | Nguyen et al. |
| 2004/0233867 A1 | * | 11/2004 | Wheatley et al. ............ 370/328 |
| 2005/0009529 A1 | | 1/2005 | Chen et al. |
| 2005/0030931 A1 | | 2/2005 | Sung et al. |
| 2005/0058135 A1 | | 3/2005 | Sisto et al. |
| 2005/0122999 A1 | | 6/2005 | Scherzer et al. |
| 2005/0233710 A1 | * | 10/2005 | Lakkis et al. ............... 455/102 |
| 2006/0013181 A1 | | 1/2006 | Stolpman et al. |
| 2006/0050664 A1 | | 3/2006 | Guey |
| 2006/0110162 A1 | | 5/2006 | Tian et al. |
| 2006/0153283 A1 | | 7/2006 | Scharf et al. |
| 2007/0004415 A1 | * | 1/2007 | Abedi ........................ 455/442 |
| 2007/0021117 A1 | * | 1/2007 | McKenna et al. ........... 455/431 |
| 2007/0025398 A1 | | 2/2007 | Yonge, III et al. |
| 2007/0030834 A1 | | 2/2007 | Rappaport |
| 2007/0047499 A1 | * | 3/2007 | Montojo et al. ............. 370/335 |
| 2007/0070908 A1 | | 3/2007 | Ghosh et al. |
| 2007/0189404 A1 | | 8/2007 | Baum et al. |
| 2008/0075033 A1 | * | 3/2008 | Shattil ........................ 370/328 |
| 2008/0076432 A1 | * | 3/2008 | Senarath et al. ............. 455/442 |
| 2008/0095121 A1 | * | 4/2008 | Shattil ........................ 370/335 |
| 2008/0108361 A1 | | 5/2008 | Ylanen et al. |
| 2008/0146177 A1 | * | 6/2008 | Hwang et al. ............. 455/187.1 |
| 2008/0186855 A1 | | 8/2008 | Becker |
| 2008/0186856 A1 | | 8/2008 | Becker |
| 2008/0186857 A1 | * | 8/2008 | Becker ....................... 370/235 |
| 2008/0186859 A1 | * | 8/2008 | Becker ....................... 370/236 |
| 2008/0186860 A1 | | 8/2008 | Becker |
| 2008/0186861 A1 | | 8/2008 | Becker |
| 2008/0186940 A1 | * | 8/2008 | Becker ....................... 370/345 |
| 2008/0186975 A1 | * | 8/2008 | Becker .................... 370/395.4 |
| 2008/0186994 A1 | * | 8/2008 | Becker ....................... 370/431 |
| 2008/0186997 A1 | | 8/2008 | Becker |
| 2008/0187003 A1 | | 8/2008 | Becker |
| 2008/0212524 A1 | | 9/2008 | Niwano |
| 2008/0219211 A1 | * | 9/2008 | Franceschini et al. ....... 370/330 |
| 2008/0219220 A1 | | 9/2008 | Gerakoulis |
| 2008/0304506 A1 | * | 12/2008 | Becker et al. ............... 370/441 |
| 2008/0304507 A1 | | 12/2008 | Irvine |
| 2009/0080375 A1 | * | 3/2009 | Jalil et al. ................... 370/329 |
| 2009/0129334 A1 | | 5/2009 | Ma et al. |
| 2009/0141680 A1 | * | 6/2009 | Becker ....................... 370/329 |
| 2009/0141736 A1 | | 6/2009 | Becker |

FOREIGN PATENT DOCUMENTS

| | | |
|---|---|---|
| EP | 0680168 A2 | 11/1995 |
| EP | 0917317 A | 5/1999 |
| EP | 1526655 A2 | 4/2005 |
| EP | 1909526 A | 4/2008 |
| JP | 2003-169164 A | 6/2003 |
| WO | WO 93/15573 A | 8/1993 |
| WO | WO 2004/054221 A1 | 6/2004 |
| WO | WO 2007/052249 A2 | 5/2007 |

OTHER PUBLICATIONS

Chan M.C. B. et al "A Dynamic Reservation Protocol for LEO Mobile Satellite Systems" IEEE Journal on Selected Areas in Communications, Apr. 1, 2004, pp. 559-573, vol. 22, No. 3.

Chitre et al; "Random Access with Notification—A New Mutiple-Access Scheme for VSAT Networks" Comsat Technical Review, Mar. 21, 1989; pp. 99-12; vol. 19 No. 1; Communications Satellite Corporation; Washington US.

Ghosh et al; "Random Access Design for UMTS Air-Interface Evolution;" IEEE 65$^{th}$ Vehicular Technology Conference; pp. 1041-1045; Apr. 1, 2007.

Haberle H. et al, "G2-Combinations of Frequency, Time and Space Division Multiple Access in Multitransponder Satellite Communications"; pp. 432-440, Nov. 1, 1972.

Hideto et al, "A Wavelet Packet Modulation Method for Satellite Communications," Nov. 1, 2005 pp. 1-5.

"Orthonogal Pilot Channel Structure in E-UTRA Uplink;" TSG-RANAD HOC LTE; Jan. 25, 2006; pp. 1-8; Section 2-4.

"Random Access Burst Design for E-UTRA;" Panasonic, NTT DoCoMO; TSG-RAW WG1 Meeting #46; Aug. 28, 2006; pp. 1-9; Section 2-3; Tallinn, Estonia.

Tallal O; "Mac Architecture for Broadband satellite access system" Apr. 20, 2000 at URL http///users.encs.concordia.ca/{tahar/theses/Tallal-Thesis.pdf,.

PCT Written Opinion of the International Searching Authority for Application No. PCT/US/2008/053199; mailed Jul. 18, 2008; pp. 11.

PCT Search Report of the International Searching Authority for Application No. PCT/US/2008/053199 mailed on Jul. 18, 2008 pp. 4.

PCT Written Opinion of the International Searching Authority for Application No. PCT/US/2008/053200; mailed Jul. 18, 2008; pp. 10.

PCT Search Report of the International Searching Authority for Application No. PCT/US/2008/053200; mailed on Jul. 18, 2008 pp. 4.

PCT Search Report of the International Searching Authority for Application No. PCT/US/2008/053205; mailed Jul. 18, 2008; pp. 4.

PCT Written Opinion of the International Searching Authority for Application No. PCT/US2008/053205; mailed Jul. 18, 2008; pp. 10.

PCT Search Report of the International Searching Authority for Application No. PCT/US/2008/053208; mailed on Jul. 18, 2008; pp. 4.

PCT Written Opinion of the International Searching Authority for Application No. PCT/US2008/053208; mailed Jul. 18, 2008; pp. 10.

PCT Written Opinion of the International Searching Authority for Application No. PCT/US/2008/053210; mailed on Sep. 15, 2008; pp. 9.

PCT Search Report of the International Searching Authority for Application No. PCT/US/2008/053210; mailed on Sep. 15, 2008 pp. 6.

PCT Search Report of the International Searching Authority for Application No. PCT/US/2008/066360; mailed on Jun. 9, 2008; pp. 3.
PCT Written Opinion of the International Searching Authority for Application No. PCT/US/2008/066360; mailed on Jun. 9, 2008; pp. 8.
PCT Search Report of the International Searching Autohrity for Application No. PCT/US/2008/066361; mailed on Jun. 9, 2008; pp. 4.
PCT Written Opinion of the International Searching Authority for Application No. PCT/US/2008/066361; mailed on Jun. 9, 2008; pp. 7.
PCT Search Report of the International Searching Authority for Application No. PCT/US/2008/57672; mailed on Jun. 23, 2008; pp. 7.
PCT Written Opinion of the International Searching Authority for Application No. PCT/US/2008/57672; mailed on Jun. 23, 2008 pp. 3.
PCT Search Report of the International Searching Authority for Application No. PCT/US/2008/084574; mailed on Jan. 28, 2009; pp. 2.
PCT Written Opinion of the International Searching Authority for Application No. PCT/US/2008/084574; mailed on Jan. 28, pp. 7.
PCT Search Report of the International Searching Authority for Application No. PCT/US/2008/084577; mailed on Feb. 5, 2009; pp. 2.
PCT Written Opinion of the International Searching Authority for Application No. PCT/US/2008/084577; mailed on Feb. 5, 2009; pp. 7.
Non-Final Office Action for U.S. Appl. No. 11/771,910; mailed on Jun. 18, 2009; pp. 17.
Non-Final Office Action for U.S. Appl. No. 11/771,882; mailed on Jun. 22, 2009; pp. 22.
Non-Final Office Action for U.S. Appl. No. 11/771,856; mailed on Jul. 8, 2009; pp. 7.
Non-Final Office Action for U.S. Appl. No. 11/771,870; mailed on Jul. 8, 2009; pp. 10.
Non-Final Office Action for U.S. Appl. No. 11/771,810; mailed on Jul. 21, 2009; pp. 18.
Non-Final Office Action for U.S. Appl. No. 11/771,798 mailed on Jul. 24, 2009; 22 pages.
Non-Final Office Action for U.S. Appl. No. 11/771,894; mailed on Jul. 23, 2009; 26 pages.
Non-Final Office Action for U.S. Appl. No. 11/771,828; mailed on Jul. 24, 2009; 21 pages.
Non-Final Office Action for U.S. Appl. No. 11/771,903 mailed on Jul. 31, 2009; 24 pages.
"IEEE Standard for Local and Metropolitan Area Networks, Part 16: Air Interface for Fixed Broadband Wireless Access Systems—Amendment 2: Medium Access Control Modifications and Additional Physical Layer Specifications for 2-11 GHz," IEEE Std 802.16a™ Apr. 1, 2003, 318 pages, New York, New York.
"IEEE Standard for Local and Metropolitan Area Networks, Part 16: Air Interface for Fixed Broadband Wireless Access Systems," IEEE, May 29, 2009; 864 pages, New York, New York.
"IEEE Standard for Local and Metropolitan Area Networks, Part 16: Air Interface for Fixed Broadband Wireless Access Systems, Amendment 2: Physical and Medium Access Control Layers for Combined Fixed and Mobile Operation in Licensed Bands and Corrigendum 1," IEEE, Feb. 28, 2006, 864 pages, New York, New York.
Non-Final Office Action for U.S. Appl. No. 11/771,762 mailed on Oct. 16, 2009; 21 pages.
Notice of Allowance for U.S. Appl. No. 11/771,856 mailed on Dec. 15, 2009; 4 pages.
Notice of Allowance for U.S. Appl. No. 11/771,870 mailed on Dec. 23, 2009; 4 pages.
Final Office Action for U.S. Appl. No. 11/771,882 mailed on Dec. 8, 2009; 30 pages.
Final Office Action for U.S. Appl. No. 11/771,894 mailed on Jan. 12, 2010; 33 pages.
Final Office Action for U.S. Appl. No. 11/771,903 mailed on Jan. 5, 2010; 36 pages.
Final Office Action for U.S. Appl. No. 11/771,910 mailed on Dec. 8, 2009; 19 pages.
Non-Final Office Action for U.S. Appl. No. 11/771,926 mailed on Nov. 27, 2009; 29 pages.
Final Office Action for U.S. Appl. No. 11/771,762 mailed on Feb. 5, 2010; 20 pages.
Final Office Action for U.S. Appl. No. 11/771,798 mailed on Jan. 25, 2010; 33 pages.
Final Office Action for U.S. Appl. No. 11/771,810 mailed on Jan. 27, 2010; 30 pages.
Final Office Action for U.S. Appl. No. 11/771,828 mailed on Jan. 22, 2010; 35 page.
Supplemental Notice of Allowability for U.S. Appl. No. 11/771,856 mailed on Feb. 12, 2010; 6 pages.
Supplemental Notice of Allowability for U.S. Appl. No. 11/771,856 mailed on Mar. 10, 2010; 2 pages.
Supplemental Notice of Allowability for U.S. Appl. No. 11/771,870 mailed on Feb. 12, 2010; 2 pages.
Supplemental Notice of Allowability for U.S. Appl. No. 11/771,870 mailed on Mar. 10, 2010; 2 pages.
Advisory Action for U.S. Appl. No. 11/771,882 mailed on Mar. 22, 2010; 5 pages.
Advisory Action for U.S. Appl. No. 11/771,903 mailed on Mar. 11, 2010; 3 pages.
Advisory Action for U.S. Appl. No. 11/771,910 mailed on Mar. 8, 2010; 5 pages.
International Preliminary Report on Patentability for PCT Application No. PCT/US2008/066360 mailed on Dec. 23, 2009; 8 pages.
International Preliminary Report on Patentability for PCT Application No. PCT/US2008/066361 mailed on Dec. 23, 2009; 8 pages.
Advisory Action for U.S. Appl. No. 11/771,798 mailed on Apr. 13, 2010; 3 pages.
Advisory Action for U.S. Appl. No. 11/771,810 mailed on Apr. 15, 2010; 3 pages.
Advisory Action for U.S. Appl. No. 11/771,828 mailed on Apr. 9, 2010; 3 pages.
Supplemental Notice of Allowability for U.S. Appl. No. 11/771,856 mailed on Mar. 23, 2010; 3 pages.
Advisory Action for U.S. Appl. No. 11/771,894 mailed on Apr. 1, 2010; 3 pages.
"Distributed Bandwith Request and Allocation in Multi-Hop Relay" IEEE 802.16 Broadband Wireless Access Working Group; Jan. 8, 2007; 8 pages.
Final Office Action U.S. Appl. No. 11/771,926 mailed on May 19, 2010; 18 pages.
Non-Final Office Action U.S. Appl. No. 11/771,828 mailed on May 24, 2010; 24 pages.

* cited by examiner

Contention Code Request Channel Example

| | |
|---|---|
| Scheduled Transmission Data Length | 800 channel symbols (100 bytes) |
| Average Interval of Scheduled Transmissions From Each Node | 8 seconds |
| Average Bandwidth of Scheduled Transmissions From Each Node is 100 symbols/sec | 100 symbols/sec |
| Ratio of Request Symbols to Scheduled Transmission Symbols | 8/100 |
| 64 Request Symbols | 800 Scheduled Transmission Symbols |
| SNR Spreading Gain of 64-Chip Spread Code | 18 dB |
| Request Channel Load Factor | 1/64 |
| Collision Probability of Requests | 1.55% |

FIG. 13

Polled Code Request Channel Example

| | |
|---|---|
| Scheduled Transmission Data Length | 800 channel symbols (100 bytes) |
| Average Interval of Scheduled Transmissions From Each Node | 8 seconds |
| Average Bandwidth of Scheduled Transmissions From Each Node is 100 symbols/sec | 100 symbols/sec |
| Set Node Request Poll Interval | 125 msec (8 request opportunities/sec/node) |
| Ratio of Request Symbols to Scheduled Transmission Symbols | 8/100 |
| 64 Request Symbols | 800 Scheduled Transmission Symbols |
| SNR Spreading Gain of 64-Chip Spread Code | 18 dB |
| Collision Probability of Requests | 0% |

FIG. 14

Piggyback Requests for Request Collision Detection and Missed Request Processing

| Event | Action |
|---|---|
| Request detected in request signal space | Assign a scheduled transmission segment to the request |
| Single piggyback request received associated with request detected in request signal space | Ignore single piggyback request |
| Multiple piggyback requests received associated with request detected in request signal space | Assign a scheduled transmission segment to each piggyback request |
| Piggyback request received for undetected request in request signal space | Assign a scheduled transmission segment to piggyback request |

FIG. 16

REQUEST SIGNAL DESIGNS FOR MULTIPLE SERVICE TYPES

CROSS-REFERENCES TO RELATED APPLICATIONS

The present application claims benefit of priority under 35 U.S.C. 119(e) of U.S. provisional Application No. 60/888,451, filed on Feb. 6, 2007, entitled "Symbol Oriented Reservation Request System For Controlling Access To A Shared Communications Link," the content of which is incorporated herein by reference in its entirety.

The present application also claims benefit of priority under 35 U.S.C. 119(e) of U.S. provisional Application No. 60/895,143, filed on Mar. 16, 2007, entitled "Blip and Burst Multiple Access," the content of which is incorporated herein by reference in its entirety.

The following U.S. nonprovisional patent applications, including the present application, are being filed concurrently and the disclosure of every other application is incorporated by reference in the present application in its entirety for all purposes:

- U.S. Nonprovisional Patent Application No. 11/771,762, filed Jun. 29, 2007, entitled "Reservation Request System for Controlling Access to a Shared Communication Medium."
- U.S. Nonprovisional Patent Application No. 11/771,798, filed Jun. 29, 2007, entitled "Time Multiplexed Requests for Controlling Access to a Shared Communication Medium."
- U.S. Nonprovisional Patent Application No. 11/771,810, filed Jun. 29, 2007, entitled "Code Multiplexed Requests for Controlling Access to a Shared Communication Medium."
- U.S. Nonprovisional Patent Application No. 11/771,828, filed Jun. 29, 2007, entitled "Contention and Polled Requests for Scheduling Transmissions."
- U.S. Nonprovisional Patent Application No. 11/771,840, filed Jun. 29, 2007, entitled "Request Signal Designs for Multiple Service Types."
- U.S. Nonprovisional Patent Application No. 11/771,856, filed Jun. 29, 2007, entitled "Default Assignment of Scheduled Transmissions."
- U.S. Nonprovisional Patent Application No. 11/771,870, filed Jun. 29, 2007, entitled "Successive Scheduled Requests for Transmission."
- U.S. Nonprovisional Patent Application No. 11/771,882, filed Jun. 29, 2007, entitled "Piggyback Requests in Scheduled Transmissions."
- U.S. Nonprovisional Patent Application No. 11/771,894, filed Jun. 29, 2007, entitled "Robust and Efficient Assignment of Scheduled Transmissions."
- U.S. Nonprovisional Patent Application No. 11/771,903, filed Jun. 29, 2007, entitled "Request Detection Error Processing."
- U.S. Nonprovisional Patent Application No. 11/771,910, filed Jun. 29, 2007, entitled "Assignment Modes for a Shared Communication Medium."
- U.S. Nonprovisional Patent Application No. 11/771,926, filed Jun. 29, 2007, entitled "Reservation Request Improvements."

BACKGROUND OF THE INVENTION

In many applications, a communication medium is shared among a number of nodes. The nodes compete with one another for access to the shared communication medium. At any given moment, there may be more than one of the nodes that wish to transmit data over the shared communication medium. A system is typically put in place to facilitate access to the shared communication medium by the various nodes. Various categories of such multiple access systems have been developed.

One category of multiple access systems utilizes contention protocols. Examples of these contention protocols include the ALOHA protocol and the slotted ALOHA protocol, which are known in the art. Here, each node is allowed to freely transmit its data over the shared communication medium at any time or any slotted time. In a system employing a hub, each node sends its transmission to the hub, which then broadcasts the transmission to all nodes. In a system without a hub, each node directly broadcasts its transmission to all nodes. In either case, every node listens to the channel for its own transmission and attempts to receive it. If a node is unsuccessful in receiving its own transmission, the node can assume that its transmission was involved in a collision with another transmission, and the node simply re-transmits its data after waiting a random amount of time. In this manner, collisions are allowed to occur but are resolved by the nodes.

Another category of multiple access systems utilizes carrier sense protocols. Examples include persistent carrier sense multiple access (persistent CSMA) and non-persistent carrier sense multiple access (non-persistent CSMA) protocols, which are known in the art. Generally speaking, these protocols require each node to listen to the shared communication medium before transmitting. Only if the shared communication medium is available is the node allowed to transmit its data. In persistent CSMA, when a node senses that the shared communication medium is not available, the node continually listens to the shared communication medium and attempts to transmit as soon as the medium becomes available. In non-persistent CSMA, when a node senses that the shared communication medium is not available, the node waits an amount of time before attempting to listen to the shared communication channel for an opportunity to transmit. Even though a node listens first before transmitting, there still exists a probability for collisions. This is because when the medium is available, two or more nodes can detect the availability and decide that they are going to transmit data. Various techniques have been developed to handle such collisions.

Yet another category of multiple access systems utilizes contention free protocols. Here, each node can reserve the shared communication medium in order to transmit data. The node can transmit data without colliding with transmissions from other nodes. This is because the shared communication medium is reserved, for a particular time duration for example, for the node's transmission and not for any other transmission. A significant advantage of contention free protocols is that the communication medium is not taken up by unsuccessful transmissions that collide with one another and resulting re-transmission attempts. This can lead to a more efficient use of the shared communication medium, especially as the number of nodes and number of data transmissions increase.

However, contention free protocols require a reservation process that allows nodes to reserve use of the shared communication medium. Making such reservations also requires communications. If the reservation process itself occupies too much of the shared communication medium, performance of the system can be negatively impacted. Thus, to take full advantage of the benefits of contention free multiple access, more efficient systems for reservation of the shared communication medium are needed.

BRIEF SUMMARY OF THE INVENTION

The present invention relates to methods and apparatuses for conducting communications over a shared communication medium involving a plurality of nodes, involving (a) sending a request from a first node in the plurality of nodes, the shared communication medium organized to include a request signal space and a scheduled transmission signal space, the request signal space including a plurality of request segments each having a different location within the request signal space, the scheduled transmission signal space including a plurality of scheduled transmission segments each having a different location within the scheduled transmission signal space, the request sent in a request segment that is one of the plurality of request segments, (b) obtaining an assignment associating the request with a scheduled transmission segment selected from the plurality of scheduled transmission segments, the assignment taking into account location of the request within the request signal space, (c) from the first node, sending a data transmission in the scheduled transmission segment associated with the request in accordance with the assignment, and (d) wherein the plurality of scheduled transmission segments include multiple categories of scheduled transmission segments associated with different service types.

The plurality of request segments may include multiple categories of requests segments, wherein each category of request segments is used for requesting transmission in a particular category of scheduled transmission segments associated with a particular service type. In one embodiment, the request may comprise 1 symbol in the request signal space. In another embodiment, the request comprises N symbols sent in the request signal space, N being a positive integer. The N symbols of the request may be non-coherently detected. For example, the N symbols of the request may specify one out of $2^N-1$ service types. Alternatively, the N symbols of the request may be coherently detected. The N symbols of the request may be modulated according to a modulation scheme. For example, the modulation scheme may be an M-ary differential phase shift keying (M-DPSK) modulation scheme. The N symbols of the request may specify one out of $M^{N-1}$ service types. Furthermore, the N symbols of the request may be coded according to a coding scheme. For example, the coding scheme may be a block coding scheme.

The present invention further relates to methods and apparatuses for conducting communications over a shared communication medium involving a plurality of nodes including a first node and a second node, involving (a) at the second node, receiving a request from the first node, the shared communication medium organized to include a request signal space and a scheduled transmission signal space, the request signal space including a plurality of request segments each having a different location within the request signal space, the scheduled transmission signal space including a plurality of scheduled transmission segments each having a different location within the scheduled transmission signal space, the request sent in a request segment that is one of the plurality of request segments, (b) at the second node, making an assignment associating the request with a scheduled transmission segment selected from the plurality of scheduled transmission segments, the assignment taking into account location of the request within the request signal space, and sending a corresponding assignment message, (c) at the second node, receiving a data transmission from the first node in the scheduled transmission segment associated with the request, and (d) wherein the plurality of scheduled transmission segments include multiple categories of scheduled transmission segments associated with different service types.

BRIEF DESCRIPTION OF THE DRAWINGS

FIG. 13 presents a more detailed example of a system with a contention code request channel, according to an embodiment of the invention.

FIG. 14 presents a more detailed example of a system with a polled code request channel, according to an embodiment of the invention.

FIG. 16 depicts use of piggyback requests for request collision detection and missed request processing, according to an embodiment of the invention.

DETAILED DESCRIPTION OF THE INVENTION

The present invention relates to communications conducted over a shared communications medium involving a plurality of nodes. The invention is specifically related to techniques employed for assigning opportunities for transmission based on requests.

Figure 1:
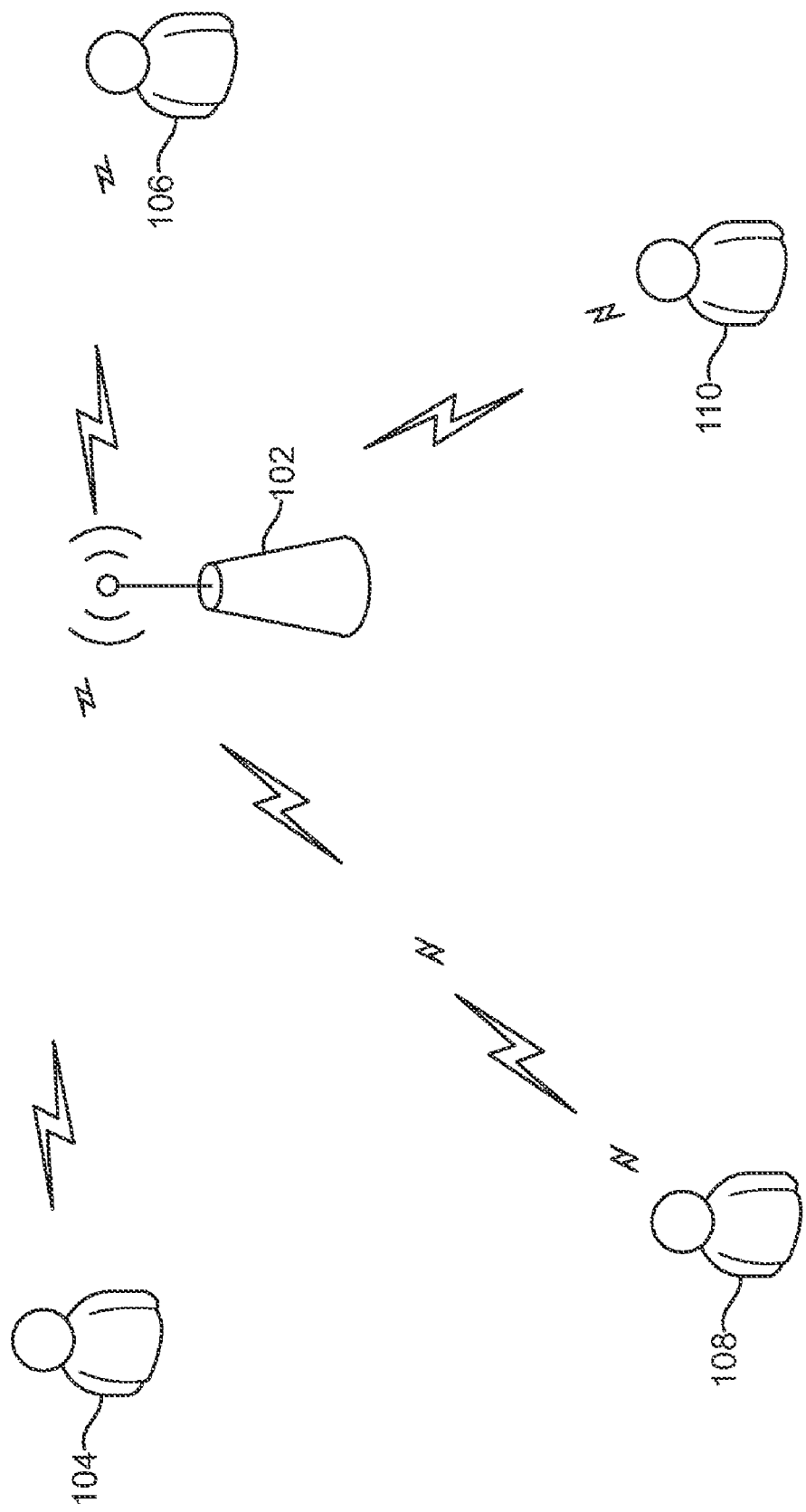
FIG. 1 presents a simplified network including a scheduler node 102 and a plurality of access nodes 104, 106, 108, and 110 utilizing a shared communication medium, according to one embodiment of the invention.

FIG. 1 presents a simplified network including a scheduler node 102 and a plurality of access nodes 104, 106, 108, and 110 utilizing a shared communication medium, according to one embodiment of the invention. This configuration corresponds to a mode of operation referred to here as "scheduler mode," which is described as an illustrative example.

Referring to FIG. 1, scheduler node 102 serves to control usage of the shared communication medium by access nodes 104, 106, 108, and 110. The shared communication medium can represent any communication medium that may be utilized by more than one node. For example, the shared communication medium can represent signal space in one or more satellite channels. Thus, the access nodes and the scheduler node may be part of a satellite network. As another example, the shared communication medium can represent signal space in one or more wireless terrestrial channels. Thus, the access nodes and the scheduler node may be part of a terrestrial wireless network. As yet another example, the shared communication medium can represent signal space in one or more wired channels. Thus, the access nodes and scheduler node may be part of a wired network.

Furthermore, embodiments of the present invention may be implemented in different network topologies that involve a shared communication medium. These may include star topologies, mesh topologies, bus topologies, and others.

In the present embodiment of the invention, scheduler node 102 provides control over access of the shared communication medium by access nodes 104, 106, 108, and 110. In order to transmit data over the shared communication medium, an access node such as access nodes 104, 106, 108, and 110 first send a request to scheduler node 102. In response, scheduler node 102 assigns an opportunity for data transmission to the access node. Scheduler node 102 sends an assignment message associated with the assignment to the access nodes. Upon receiving the assignment, the access node that made the request can transmit data in the assigned transmission opportunity. This general scheme of request, assignment, and transmission is used in various embodiments of the invention. However, as noted before, other embodiments of the invention may involve variations and different operations.

Symbols

Generally speaking, a basic unit of data transmission is referred to here as a "symbol." A symbol can be defined to have one out of a number of possible values. For example, a binary symbol may have one of two possible values, such as "0" and "1." Thus, a sequence of N binary symbols may convey $2^N$ possible messages. More generally speaking, an M-ary symbol may have M possible values. Thus, a sequence of N M-ary symbols may convey $M^N$ possible messages.

The concept of symbol and the methods by which a symbol can assume values is quite general. In many applications, a symbol is associated with a defined baseband pulse shape which is up-converted to a carrier frequency with a particular phase relationship to the carrier and with a particular amplitude. The amplitude and/or phase of the symbol is known as the modulation and carries the information of a symbol. The set of permissible modulation points defined in the amplitude and phase plane is known as the modulation constellation. The amount of information that a symbol may convey is related to the number of discrete points of the constellation. 16-QAM is an example of amplitude-phase constellation which allows transmission of up to 4 bits of information per symbol. In some applications, only the phase is used for modulation. Quadra-phase shift keying (QPSK) is an example of pure phase modulation which allows transmission of up to 2 bits of information per symbol. In other applications, the symbol waveform may be defined such that symbol phase may either not exist or be difficult to receive accurately, in which case pure amplitude modulation can be used. One example of binary amplitude modulation is on-off amplitude-shift keying modulation which allows transmission of up to 1 bit of information per symbol.

Each symbol may occupy a particular portion of the relevant signal space. Specifically, each symbol may be said to occupy a certain amount "time-bandwidth product." Here, an amount of time-bandwidth product is a scalar quantity that may be measured in units of Hz-seconds and does not necessarily dictate how the signal is distributed within the signal space. In theory, symbols cannot be strictly limited in both time and frequency. It is customary, however, to define the time-bandwidth product of a signal to be the time-bandwidth product of the region in which the preponderance of signal energy resides. Since precise definitions of time-bandwidth product vary somewhat throughout the literature, figures showing symbol boundaries in time-frequency space should only be considered as approximate representations.

Just as a simple example, a signal spanning a bandwidth of 1 Hz and lasting a duration of 1 second may have a time-bandwidth product of 1 Hz-second. A signal spanning a bandwidth of 0.5 Hz and lasting a duration of 2 seconds may also have a time-bandwidth product of 1 Hz-second. Similarly, a signal spanning a bandwidth of 0.1 Hz and lasting a duration of 10 seconds may also have a time-bandwidth product of 1 Hz-second. These examples do not assume any multiplexing of the signal space, which is discussed separately below. Also, the particular values used in these example and other examples described herein are for illustrative purpose only. Different values may be used in actual systems.

The measurement of a symbol in terms of an amount of time-bandwidth product is also applicable when different signal space multiplexing techniques are employed. Such techniques may include time-division multiplexing, frequency-division multiplexing, wavelet-division multiplexing, code-division multiplexing, and/or others. In each of the following four examples, a symbol occupies a time-bandwidth product of 1 Hz-second, even though different signal space multiplexing techniques are used.

Figure 2:
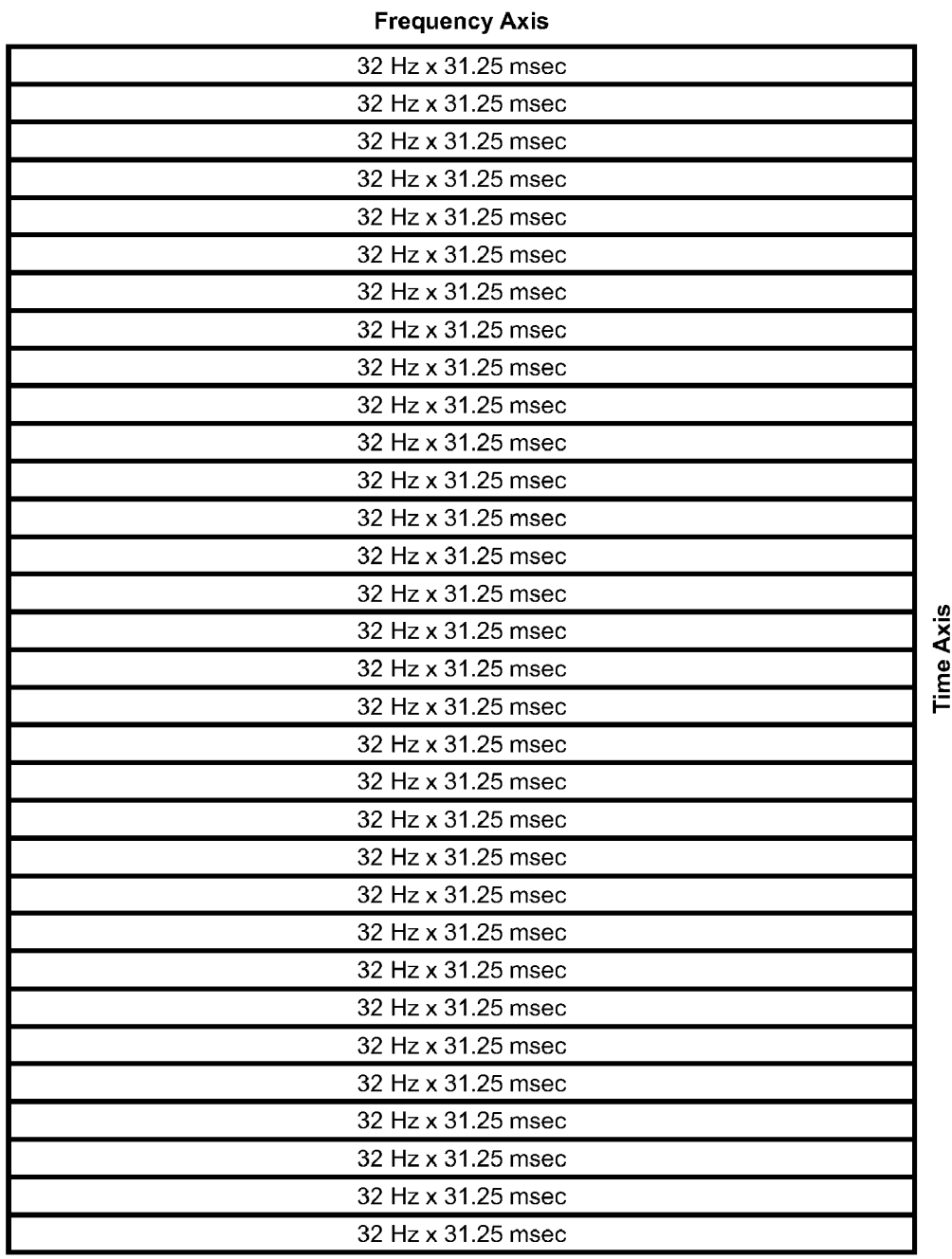
FIG. 2 depicts a time-division multiplexing scheme as applied to a frequency channel having a bandwidth of 32 Hz over a duration of 1 second.

In a first example, FIG. 2 depicts a time-division multiplexing scheme as applied to a frequency channel having a bandwidth of 32 Hz over a duration of 1 second. The channel is divided into 32 time slots, each having a duration of $\frac{1}{32}$ second. A symbol may be transmitted in each $\frac{1}{32}$-second time slot over the bandwidth of 32 Hz. In this example, each symbol has a time-bandwidth product of 1 Hz-second.

Figure 3:
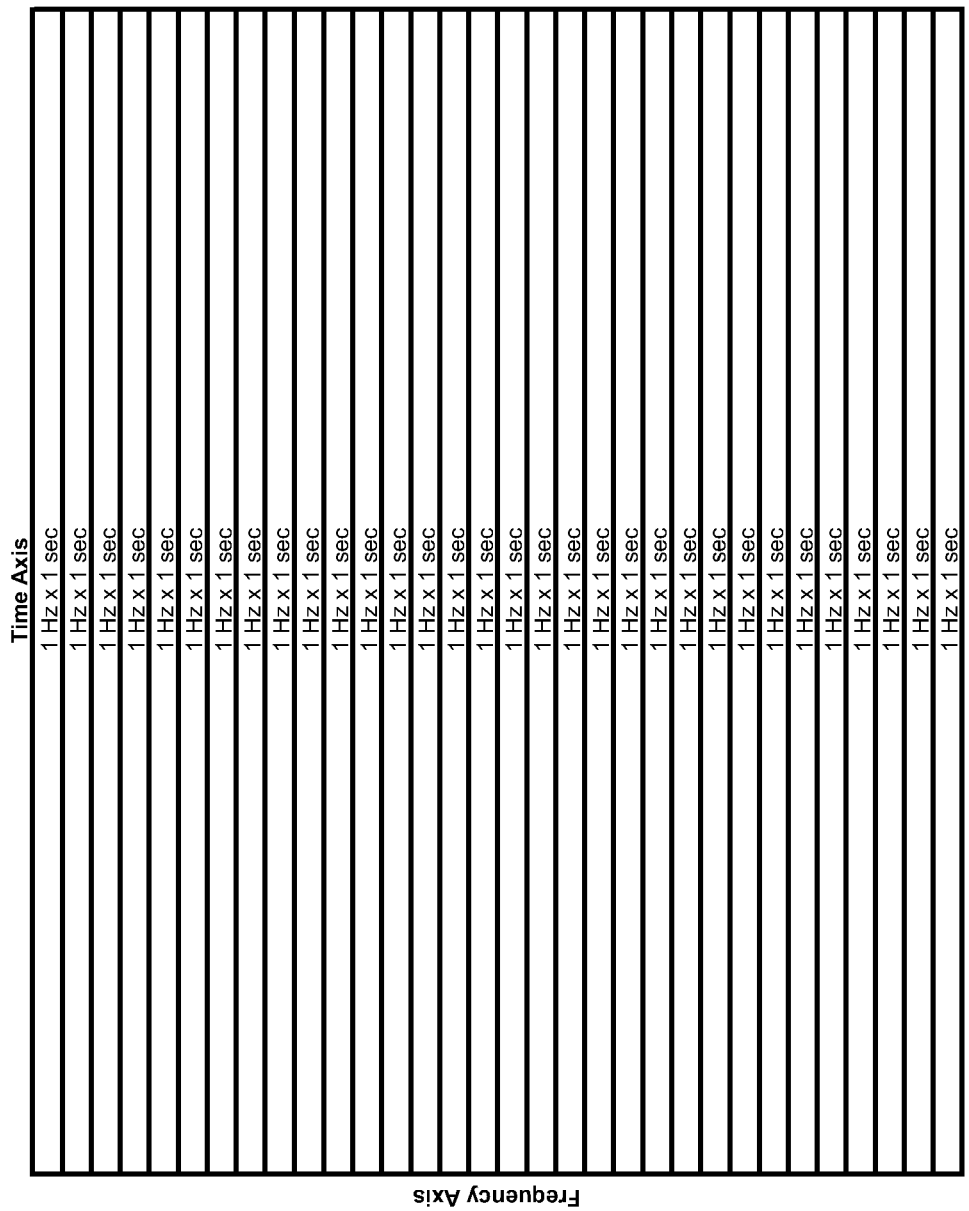
FIG. 3 depicts a frequency division multiplexing scheme as applied to a frequency channel having a bandwidth of 32 Hz over a duration of 1 second.

In a second example, FIG. 3 depicts a frequency division multiplexing scheme as applied to a frequency channel having a bandwidth of 32 Hz over a duration of 1 second. The channel is divided into 32 different frequency sub-channels each having a bandwidth of 1 Hz. A symbol may be transmitted in each 1 Hz frequency sub-channel over the duration of 1 second. In this example, each symbol also has a time-bandwidth product of 1 Hz-second.

Figure 4:
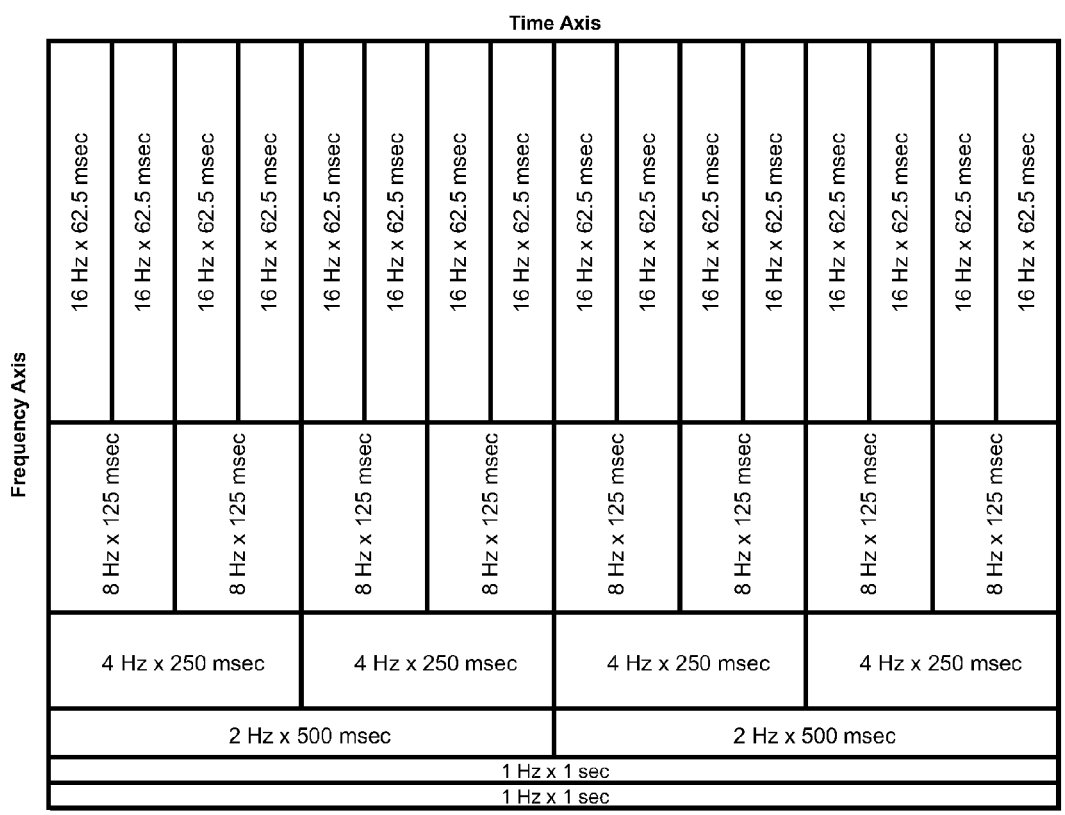
FIG. 4 depicts a wavelet-division multiplexing scheme as applied to a frequency channel having a bandwidth of 32 Hz over a duration of 1 second.

In a third example, FIG. 4 depicts a wavelet-division multiplexing scheme as applied to a frequency channel having a bandwidth of 32 Hz over a duration of 1 second. The channel is divided into 32 different time and frequency symbol segments. 2 symbol segments have a bandwidth of 1 Hz with a duration of 1 second, 2 other symbol segments have a bandwidth of 2 Hz with a duration of ½ second, 4 other symbol segments have a bandwidth of 4 Hz with a duration of ¼ second, 8 other symbol segments have a bandwidth of 8 Hz with a duration of ⅛ second, and 16 additional symbol segments have a bandwidth of 16 Hz with a duration of ¹⁄₁₆ second, In this example, each symbol has a time-frequency product of 1 Hz-second, as well.

In a fourth example, a code-division multiplexing scheme is applied to a frequency channel having a bandwidth of 32 Hz over a duration of 1 second. For this example, it is assumed that there are 32 different possible orthogonal code words, each comprising a unique 32-chip binary pattern. Each code word represents a unique "code channel." To send a symbol on a particular code channel, the symbol value is used to modulate the code word associated with the code channel, and the resulting signal is sent. In the case of binary phase shift keying (BPSK) symbols, for instance, a symbol having a value of "1" may be sent by simply sending the code word, and a symbol having a value of "0" may be sent by sending the inverted version (180-degree phase shift) of the code word. The 32 symbols sent using 32 different "code channels" are non-interfering, and as a group, they occupy a common 32 Hz by 1 second portion of the time-frequency space. In this example, each symbol has an effective time-frequency product of 1 Hz-second.

Symbol-Level Request

Referring back to FIG. 1, a symbol-level request may be sent from an access node such as access nodes 104, 106, 108, and 110 according to an embodiment of the present invention. Here, a symbol-level request refers to a request that can be sent in the form of a transmission signal having a time-bandwidth product comparable to that of a symbol. For example, a symbol-level request may occupy exactly one symbol. Thus, a protocol message comprising a large number of symbols, representing a header and a data payload that must be processed and interpreted, would not be considered a symbol-level request.

The novel use of a symbol-level request according to embodiments of the present invention allows for highly efficient utilization of the available signal space. Because of its compact size, a symbol-level request may not have sufficient capacity to carry a significant data payload. However, according to various embodiments of the invention, information may be conveyed in the choice of the location within the request signal space in which the symbol-level request is transmitted. Thus, the existence of a symbol-level request in the request signal space, as well as the location where the symbol-level request exists in the request signal space, can convey important information that is used to facilitate the assignment of transmission opportunities within the shared communication medium.

Request Signal Space and Scheduled Transmission Signal Space

According to various embodiments of the invention, the shared communication medium utilized by access nodes 104, 106, 108, and 110 may be organized into a request signal space and a scheduled transmission signal space. Just as an example, the shared communication medium may be implemented as a satellite "return-link" that allows signals to be sent from access nodes 104, 106, 108, and 110 to scheduler node 102.

The request signal space may be used by access nodes 104, 106, 108, and 110 to send requests—e.g., symbol-level requests—to request opportunities for the scheduled transmission of data. Specifically, the request signal space may be organized into a plurality of request segments. Each request segment generally refers to a portion of request signal space that may be used for sending a request.

The scheduled transmission signal space may be used by access nodes 104, 106, 108, and 110 to transmit data, once requests for transmission have been granted. The scheduled transmission signal space may be organized into a plurality of scheduled transmission segments. Each scheduled transmission segment generally refers to a portion of scheduled transmission signal space that may be used for sending a data transmission.

In accordance with the invention, the request signal space, as well as the scheduled transmission signal space, may be organized based on various multiplexing techniques. Thus, the plurality of request segments in the request signal space may represent allotments defined based on one or more types of multiplexing techniques applied to the request signal space. As mentioned previously, these may include time-division multiplexing, frequency-division multiplexing, wavelet-division multiplexing, code-division multiplexing, and/or other multiplexing techniques. Similarly, the plurality of scheduled transmission segments in the scheduled transmission space may represent allotments defined based on one or more types of multiplexing techniques applied to the scheduled transmission signal space.

As such, each request segment may have a different "location" within the request signal space. For example, if a request signal space is organized according to a time-division multiplexing technique, each request segment may comprise a different time slot in the request signal space. Here, each particular request segment is said to correspond to a different location (in time) in the request signal space. The same concept can be applied to a request signal space organized according to a frequency-division multiplexing technique. In such a case, each request segment may comprise a particular frequency sub-channel and be said to correspond to a different location (in frequency) in the request signal space. The same concept can be applied to a request signal space organized according to a code-division multiplexing technique. In such a case, each request segment may comprise a particular code word and be said to correspond to a different location (in code space) in the request signal space. Similarly, the concept can be applied to a request signal space organized according to a combination of different multiplexing techniques, such as a combination of time-division multiplexing and frequency-division multiplexing techniques. In this particular example, each request segment may comprises a particular time slot in a particular frequency sub-channel and be said to correspond to a different location (in time and frequency) in the request signal space.

Also, the separation between the request signal space and the scheduled transmission signal space may be based on different multiplexing techniques. In one embodiment, time-division multiplexing is employed. For example, the request signal space and the scheduled transmission signal space may be defined over different time slots and a common frequency range. In another embodiment, frequency-division multiplexing is employed. For example, the request signal space and the scheduled transmission signal space may be defined over a common time duration and different frequency ranges. In yet another embodiment, code-division multiplexing is employed. For example, the request signal space and the scheduled transmission signal space may be defined over a common time duration and a common frequency range, but using different code words.

Feedback Signal Space

In addition, a feedback signal space may be utilized for sending the assignment messages from scheduler node 102 to access nodes 104, 106, 108, and 110. In the present embodiment of the invention, the feedback space is not a part of the shared communication medium. Continuing with a satellite system example, the feedback signal space may be implemented as a satellite "forward-link" that allows signals to be sent from scheduler node 102 to access nodes 104, 106, 108, and 110. This satellite "forward-link" may be separate from the "return-link" mentioned previously.

The present invention broadly covers different combinations of multiplexing techniques as applied to the request signal space and/or the scheduled transmission signal space. In figures discussed below, a number of examples of such multiplexing combinations are presented. The various combinations of multiplexing techniques described below are presented for illustrative purposes and are not intended to restrict the scope of the invention. In some examples, a feedback signal space is also explicitly shown along with the request signal space and the scheduled transmission signal space.

In the figures below, only a representative portion of the relevant signal space is shown. For example, if four frames of signals are shown, it should be understood that more frames may be used even though they are not explicitly illustrated. Also, the particular proportions of the various signal space designs are provided as mere examples.

Figure 5:
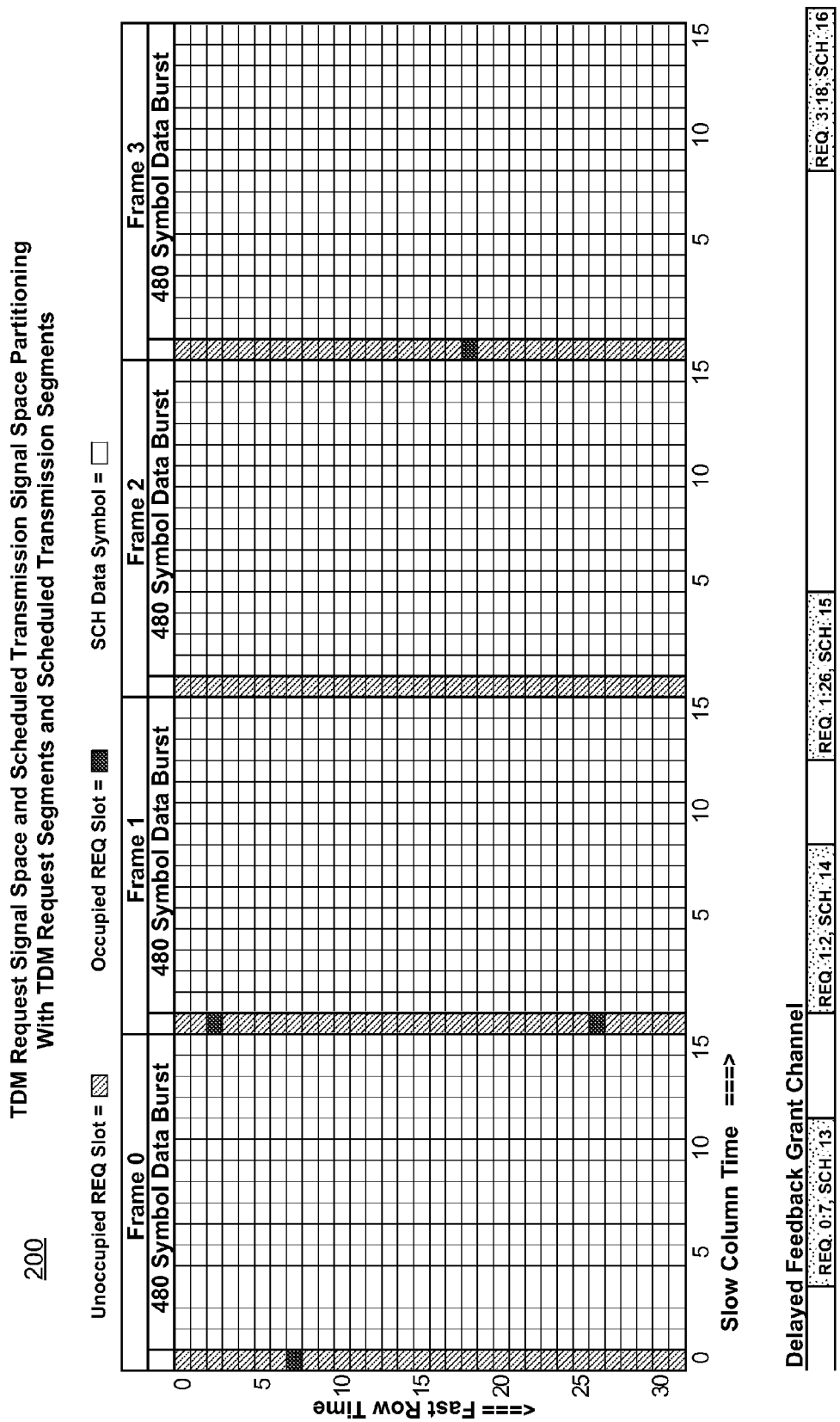
FIG. 5 is an illustrative signal diagram showing time division multiplexing (TDM) as utilized to partition the request signal space and the scheduled transmission signal space, with TDM request segments and scheduled transmission segments, according to an embodiment of the invention.

TDM Request Signal Space and Scheduled Transmission Signal Space Partitioning with TDM Request Segments and Scheduled Transmission Segments FIG. 5 is an illustrative signal diagram showing time division multiplexing (TDM) as utilized to partition the request signal space and the scheduled transmission signal space, with TDM request segments and scheduled transmission segments, according to an embodiment of the invention. The figure shows a representation of shared communication medium 200 that includes a request signal space and a scheduled transmission signal space. Separately, the figure shows a feedback signal space 250.

In this particular embodiment of the invention, the shared communication medium 200 is organized as one continuous sequence of TDM time slots. For example, the shared communication medium 200 may comprise a particular frequency channel. Each TDM time slot occupies the entire bandwidth of the frequency channel, but only for a specific time duration. Here, the TDM time slots are shown as being organized into "frames," such as Frame 0, Frame 1, Frame 2, and Frame 3. For ease of illustration, FIG. 5 presents the TDM time slots in multiple columns, instead of one continuous column. Nevertheless, it should be understood that the TDM time slots represent a single sequence of time slots that are sequentially transmitted.

For example, FIG. 5 shows that Frame 0 includes 512 TDM time slots. These 512 TDM time slots are shown as being arranged in a rectangular grid having 16 columns (Column 0 through Column 15) and 32 rows (Row 0 through Row 31). The sequence of TDM time slots is arranged in time as follows. Slots 0 through 31 of Column 1, followed by Slots 0 through 31 of Column 2, followed by Slots 0 through 31 of Column 3, and so on. In this manner, the entire sequence of 512 time slots in Frame 0 is arranged sequentially in time. Frame 1 is structured similarly and follows Frame 0. That is, the last time slot of Frame 0 is followed by the first slot of Frame 1. Frame 2 is structured similarly and follows Frame 1. Frame 3 is structure similarly and follows Frame 2, and so on. Thus, the entire sequence of TDM time slots contained in all the frames, including Frames 0, 1, 2, and 3, is arranged sequentially in time.

In the particular grid representation shown in FIG. 5, time can be seen as proceeding down each column of TDM time slots. Hence the direction down each column, across multiple rows, is labeled as "Fast Row Time." Only after proceeding through all the TDM time slots in a column can the next column be started. Thus, it takes longer to proceed from one column to the next. Hence the direction across multiple columns is labeled as "Slow Column Time."

In FIG. 5, the request signal space and scheduled transmission signal space are defined on the basis of these TDM time slots. Thus, in this example, the request signal space and the scheduled transmission signal space are separated using TDM multiplexing. Here, each frame includes a number of request segments and a single scheduled transmission segment. In Frame 0, for example, the first 32 time slots are considered 32 request segments (Column 0). The next 480 time slots are considered one scheduled transmission segment, made up of 480 symbols (Columns 1 through 15). Other frames such as Frames 0, 1, 2, and 3 are structured in a similar manner.

FIG. 5 shows the following types of signals allotments: (1) Unoccupied Request Slot, (2) Occupied Request Slot, and (3) Scheduled Transmission Data Symbol. In this example, only some of the available request segments are occupied by actual requests sent from one or more access nodes. Thus, some request segments are shown as unoccupied request slots, and others are shown as occupied request slots. Each scheduled transmission segment is shown as including a number of symbols, referred to as schedule transmission data symbols.

According to an embodiment of the invention, when an access node such as nodes 104, 106, 108, and 110 in FIG. 1 needs to request a scheduled transmission, it sends out a request in one of the request segments. Here, it is assumed that a TDM system is implemented in which all of the nodes are time-synchronized, such that every node has the capability to send signals in the appropriate time slots. Of course in practice, signals sent from various nodes may not arrive in their respective time slots with perfect timing accuracy. The TDM system may be designed to handle such imperfections, up to certain tolerances.

In one example, the request signals shown in FIG. 5 may be sent as follows. Node 104 may send a request in Slot 7 of the request signal space (Column 0) in Frame 0. Node 106 may send a request in Slot 2 of the request signal space (Column 0) in Frame 1. Node 108 may send a request in Slot 26 of the request signal space (Column 0) in Frame 1. Finally, node 110 may send a request in Slot 18 of the request signal space (Column 0) in Frame 3. Again, access nodes 104, 106, 108, and 110 are shown in FIG. 1. Of course, an access node may also send multiple requests, sometimes in the same frame. Thus, in an alternative example, all four of the requests shown in FIG. 5 may be sent from node 104. That is, node 104 may send the request in Slot 7 of the request signal space (Column 0) in Frame 0, the requests in Slot 2 and Slot 26 of the request signal space (Column 0) in Frame 1, and the request in Slot 18 of the request signal space (Column 0) in Frame 3.

According to an embodiment of the invention, scheduler node 102 shown in FIG. 1 receives the requests and makes assignments to assign each request to a scheduled transmission segment. Thus, in response to the requests, scheduler 102 send out assignment messages in a feedback signal space 250. The assignment messages are broadcast to access nodes 104, 106, 108, and 110, to inform the access nodes of the assignments made, so that each access node may correctly send data in the assigned scheduled transmission segment(s).

FIG. 5 depicts an assignment message under a "robust FIFO schedule mode," in accordance with one embodiment of the invention. In this mode, each assignment message explicitly includes a pair of data: (1) an identifier for the request and (2) an identifier for the scheduled transmission segment associated with the request. In other words, the pairing of a request to an associated scheduled transmission segment is directly stated in the assignment message. For example, as shown in FIG. 5, the first assignment message includes the pair of data "REQ 0:7, SCH 13." This indicates that the request sent in the request segment known as "REQ 0:7" (the request segment located at Frame 0, Slot 7) has been assigned the scheduled transmission segment known as "SCH 13" (the scheduled transmission segment located in Frame 13). The rest of the assignment messages follow a similar format. The second assignment message includes the pair of data "REQ 1:2, SCH 14." The third assignment message includes the pair of data "REQ 1:26, SCH 15." The fourth assignment message includes the pair of data "REQ 3:18, SCH 16."

The entire request and assignment process takes place in an anonymous manner with respect to the identity of the access nodes, according to an embodiment of the invention. Thus, a symbol-level request sent from an access node does not explicitly identify the access node. For example, assume that access node 104 sent the symbol-level request in "REQ 0:7" (Slot 7 of the request signal space of Frame 0). This symbol-level request is merely a symbol transmitted at a particular location within the request symbol space. The symbol-level request does not explicitly identify the access node 104. Similarly, the corresponding assignment message "REQ 0:7, SCH 13" broadcast from scheduler node 102 does not explicitly identify access node 104 as the intended recipient of the assignment message. Instead, the assignment message merely announces that the symbol-level request sent in the "REQ 0:7" slot has been assigned to the scheduled transmission segment "SCH 13." All of the access nodes 104, 106, 108, and 110 receive the broadcast assignment message. However, only access node 104 accepts the assignment and proceeds to send a data transmission in the scheduled transmission segment identified by the assignment. This is possible because each access node keeps track of the location(s) of the symbol-level request(s) it has sent. Access node 104 recognizes the request "REQ 0:7" identified in the assignment as one of its own and thus accepts the assignment. The other access nodes 106, 108, and 110 do not recognize the request "REQ 0:7" identified in the assignment as one of their own and thus do not accept the assignment.

In FIG. 5, the feedback signal space 250 is labeled as "Delayed Feedback Grant Channel." In this particular embodiment of the invention, an assignment message sent in feedback signal space 250 may be delayed in the sense that it may not be broadcast until some time after (perhaps multiple frame after) the initial request is made.

Two-Service TDM Request and Scheduled Transmission

Figure 6:
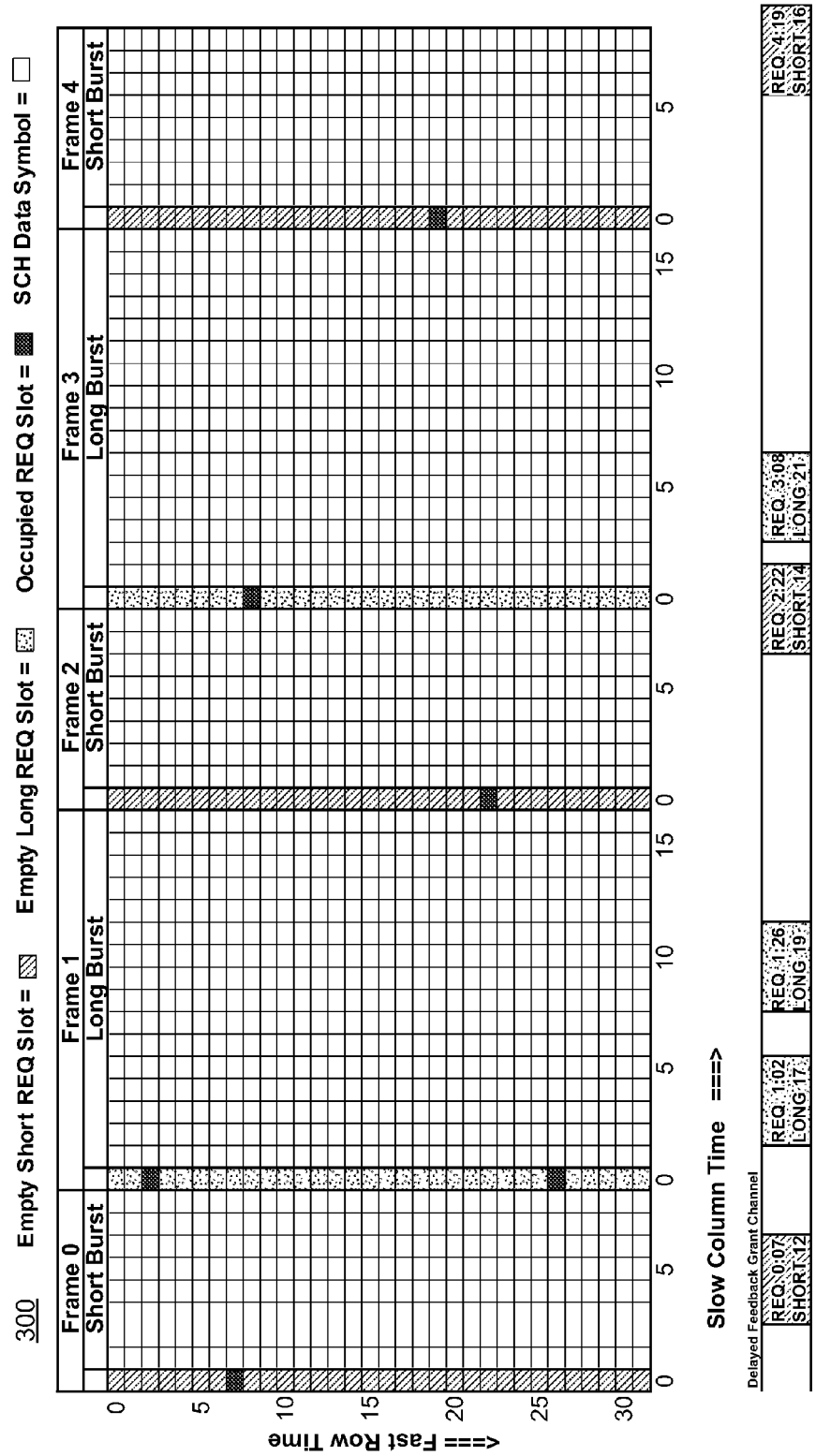
FIG. 6 is an illustrative signal diagram showing a two-service TDM request and scheduled transmission scheme, in accordance with an embodiment of the invention.

FIG. 6 is an illustrative signal diagram showing a two-service TDM request and scheduled transmission scheme, in accordance with an embodiment of the invention. The system shown in FIG. 6 is similar to the system shown in FIG. 5 in many respects. FIG. 6 shows a representation of a shared communication medium 300 that includes a request signal space and a scheduled transmission signal space. TDM is utilized to partition the request signal space and the scheduled transmission signal space. TDM request segments and scheduled transmission segments are also shown. Separately, FIG. 6 shows a feedback signal space 350.

Unlike FIG. 5, FIG. 6 introduces a two-service methodology. The distinction between different services may be based on one or more factors, such as the length of scheduled transmission, code rate, modulation method, and/or others. In the example shown in FIG. 6, the distinction between the two services is based on length of the scheduled transmission. Thus, an access node can either request a short scheduled transmission of data ($1^{st}$ service) or request a long scheduled transmission of data ($2^{nd}$ service). Here, a short transmission of data is also referred to as a "short burst," and a long scheduled transmission of data is also referred to as a "long burst."

According to an embodiment of the invention, the request segments are organized into two categories, one for the first service and the other for the second service. Similarly, the scheduled transmission segments are organized into two categories, short scheduled transmission segments for the first service and long scheduled transmission segments for the second service. An access node such as access nodes 104, 106, 108, and 110 chooses the service desired by sending a request in a request segment of the appropriate category. To request a short scheduled transmission of data ($1^{st}$ service), an access node simply sends a request in one of the $1^{st}$ service request segments. To request a long scheduled transmission of data ($2^{nd}$ service), the access node simply sends a request in one of the $2^{nd}$ service request segments.

FIG. 6 shows the following types of signals allotments: (1) Empty Short Burst Request Slot, (2) Empty Long Burst Request Slot, (3) Occupied Request Slot, and (4) Scheduled Transmission Data Symbol. The request segments comprise short burst request slots and long burst request slots. As shown in this example, only some of the available request segments are occupied by actual requests sent from one or more access nodes. Thus, some request segments are shown as unoccupied request slots, and others are shown as occupied request slots. Each scheduled transmission segment is shown as including a number of symbols, referred to as schedule transmission data symbols.

In accordance with an embodiment of the invention, the data frame structure may be used to organize the two categories of request segments and scheduled transmission segments. In this figure, even numbered frames such as Frames 0, 2, 4, etc., contain request segments and scheduled transmission segments for short scheduled transmissions of data ($1^{st}$ service). Odd numbered frames such as Frames 1, 3, 5, etc., contain request segments and scheduled transmission segments for long scheduled transmission of data ($2^{nd}$ service).

FIG. 6 presents a number of illustrative requests for the two service types, as sent from one or more access nodes such as 104, 106, 108, and 110. A short burst request is sent in Slot 7 of the request signal space in Frame 0. Two long burst requests are sent in Slots 2 and 26 of the request signal space in Frame 1. A short burst request is sent in Slot 22 of the request signal space in Frame 2. A long burst request is sent in Slot 8 of the request signal space in Frame 3. Finally, a short burst request is sent in Slot 19 of the request signal space in Frame 4.

In response, scheduler node 102 broadcasts assignment messages in feedback signal space 350. As shown in FIG. 6, the first assignment message "REQ 0:07, SHORT 12" indicates that the request sent in Slot 7 of the request signal space in Frame 0 has been assigned to the short scheduled transmission segment in Frame 12. The second assignment message "REQ 1:02, LONG 17" indicates that the request sent in Slot 2 of the request signal space in Frame 1 has been assigned to the long scheduled transmission segment in Frame 17. The third assignment message "REQ 1:26, LONG 19" indicates that the request sent in Slot 26 of the request signal space in Frame 1 has been assigned to the long scheduled transmission segment in Frame 19. The fourth assignment message "REQ 2:22, SHORT 14" indicates that the request sent in Slot 22 of the request signal space in Frame 1 has been assigned to the short scheduled transmission segment in Frame 14. The fifth assignment message "REQ 3:08, LONG 21" indicates that the request sent in Slot 8 of the request signal space in Frame 3 has been assigned to the long scheduled transmission segment in Frame 21. The fifth assignment message "REQ 4:19, SHORT 16" indicates that the request sent in Slot 19 of the request signal space in Frame 4 has been assigned to the short scheduled transmission segment in Frame 16.

The assignment messages are broadcast to access nodes 104, 106, 108, and 110, to inform the access nodes of the assignments made, so that each access node may correctly send data in the assigned scheduled transmission segment(s). While a two-service example is presented in FIG. 6, systems having more than two types of service are within the scope of the present invention. Such systems can be implemented, for example, by adopting a signal space design similar to that shown in FIG. 6 and scaling up the number of categories of request segments and scheduled transmission segments.

OFDM/TDM Request and Scheduled Transmission

Figure 7:
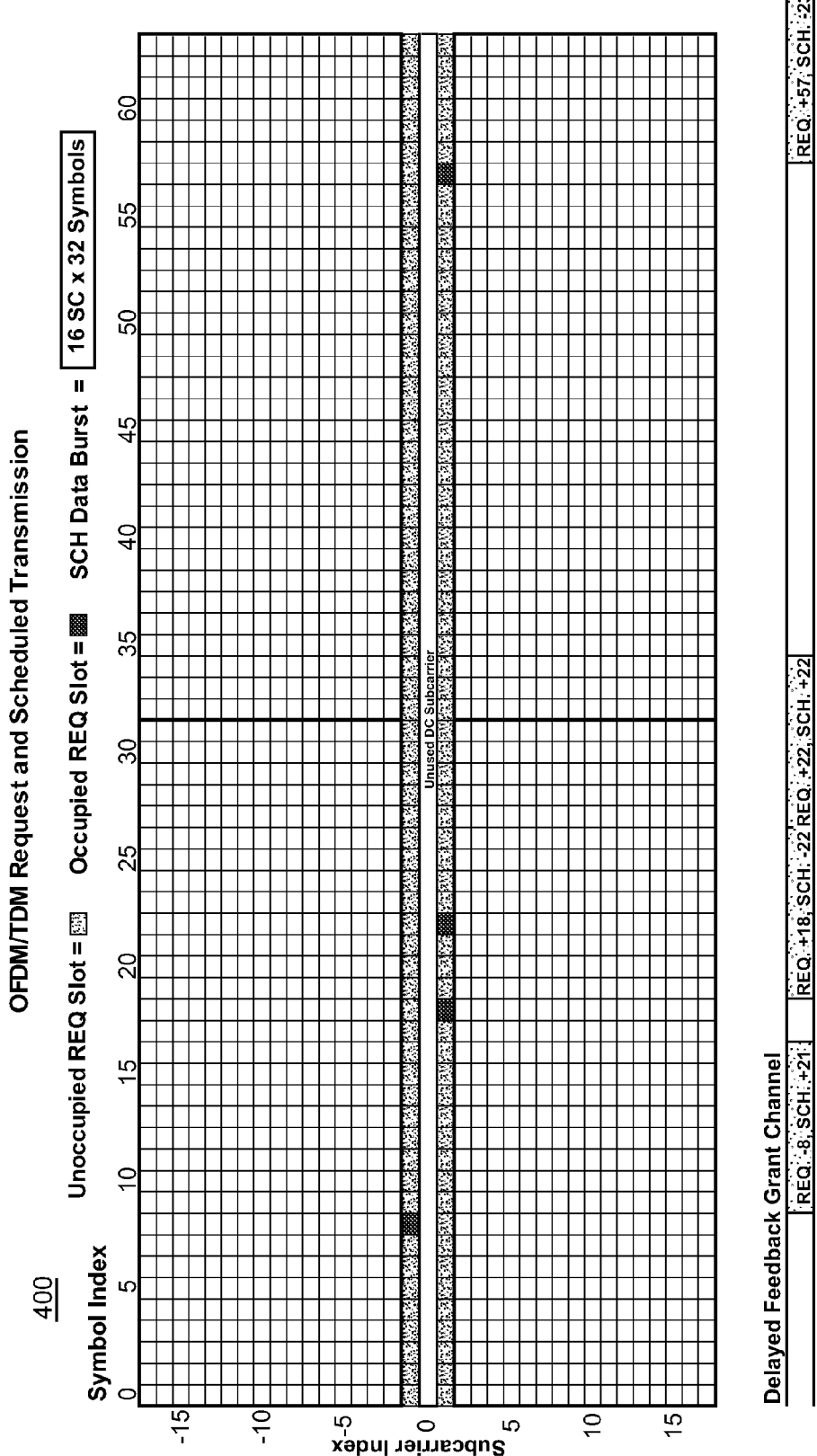
FIG. 7 is an illustrative signal diagram showing orthogonal frequency division multiplexing (OFDM) as utilized to partition the request signal space and the scheduled transmission signal space, with OFDM/TDM request segments and scheduled transmission segments, according to an embodiment of the invention.

FIG. 7 is an illustrative signal diagram showing orthogonal frequency division multiplexing (OFDM) as utilized to partition the request signal space and the scheduled transmission signal space, with OFDM/TDM request segments and scheduled transmission segments, according to an embodiment of the invention. The figure shows a representation of a shared communication medium 400 based on an OFDM structure that includes a request signal space and a scheduled transmission signal space. Separately, the figure shows a feedback signal space 450. In this particular embodiment of the invention, the shared communication medium 400 is organized into 34 different OFDM frequency channels, labeled as subcarriers −1 through −17 and 1 through 17. Each of these 34 different OFDM frequency channels is further organized into TDM time slots. The DC channel, labeled as subcarrier 0, is left unused.

According to the present embodiment of the invention, OFDM frequency channels provide a natural separation between the request signal space and the scheduled transmission signal space. As shown in FIG. 7, the request signal space comprises OFDM frequency channels −1 and 1. The scheduled transmission signal space comprises OFDM frequency channels −2 through −17 and 2 through 17.

In this embodiment, each request segment comprises a TDM time slot in one of the OFDM frequency channels −1 and 1. Each scheduled transmission segment comprises a block of 512 data symbols, spanning 16 OFDM frequency channels and 32 TDM time slots. FIG. 7 shows four such scheduled transmission segments. The first scheduled transmission segment spans OFDM frequency channels −2 through −17 and TDM time slots 0 through 31. The second scheduled transmission segment spans OFDM frequency channels 2 through 17 and TDM time slots 0 through 31. The third scheduled transmission segment spans OFDM frequency channels −2 through −17 and TDM time slots 32 through 63. The fourth scheduled transmission segment spans OFDM frequency channels 2 through 17 and TDM time slots 32 through 63. Thus, FIG. 7 presents request segments based on OFDM and TDM, as well as scheduled transmission segments based on OFDM and TDM.

FIG. 7 shows the following types of signals allotments: (1) Unoccupied Request Slot, (2) Occupied Request Slot, and (3) Scheduled Transmission Data Burst. In this example, only some of the available request segments are occupied by actual requests sent from one or more access nodes. Thus, some request segments are shown as unoccupied request slots, and others are shown as occupied request slots. Each scheduled transmission segment comprises a block of 512 data symbols referred to here as a data burst.

FIG. 7 presents a number of illustrative requests, as sent from one or more access nodes such as 104, 106, 108, and 110. A request is sent in Slot 8 in OFDM frequency channel −1. Another request is sent in Slot 18 in OFDM frequency channel 1. Another request is sent in Slot 22 in OFDM frequency channel 1. Yet another request is sent in Slot 57 in OFDM frequency channel 1.

In response, scheduler node 102 broadcasts assignment messages in feedback signal space 450. As shown in FIG. 7, the first assignment message "REQ −8, SCH +21" indicates that the request sent in Slot 8 in OFDM frequency channel −1 has been assigned to the scheduled transmission segment +21. In this example, a scheduled transmission segment is identified by a sign (positive or negative) and a sequence number. For instance, the scheduled transmission segment +21 has a positive sign (+), which indicates that this scheduled transmission segment is located on the positive side of the OFDM frequency channels (spanning the 16 positive OFDM frequency channels). The sequence number 21 indicates that this scheduled transmission segment is the 21$^{st}$ one in a sequence of scheduled transmissions.

The rest of the assignment messages can be interpreted in a similar way. The second assignment message "REQ +18, SCH −22" indicates that the request segment in Slot 18 in OFDM frequency channel 1 has been assigned to the scheduled transmission segment −22. The third assignment message "REQ +22, SCH +22" indicates that the request segment in Slot 22 in OFDM frequency channel 1 has been assigned to the schedule transmission segment +22. The fourth assignment message "REQ +57, SCH −23" indicates that the request segment in Slot 57 in OFDM frequency channel 1 has been assigned to the scheduled transmission segment −23.

The assignment messages are broadcast to access nodes 104, 106, 108, and 110, to inform the access nodes of the assignments made, so that each access node may correctly send data in the assigned scheduled transmission segment(s).

Figure 8:
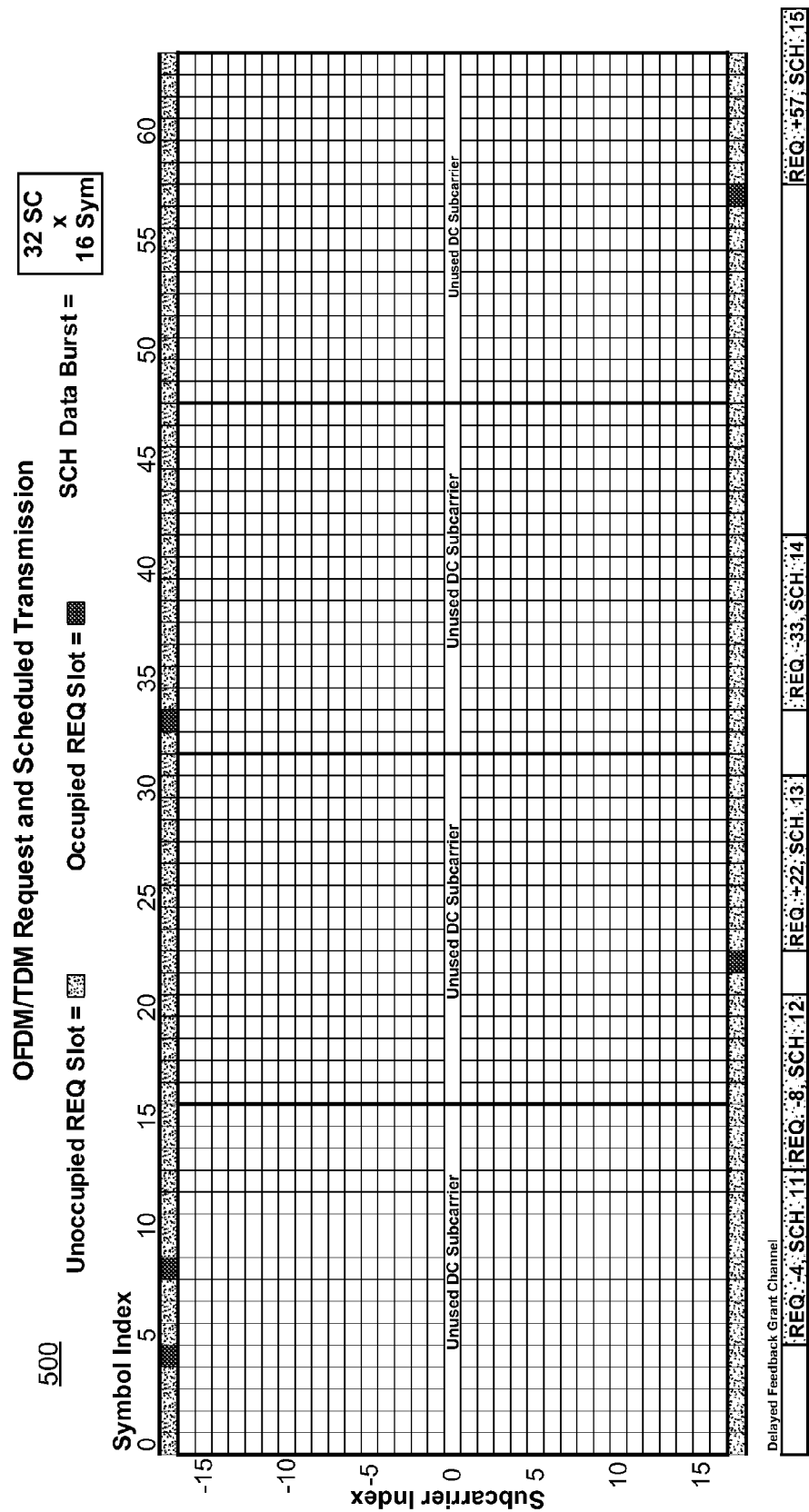
FIG. 8 is an illustrative signal diagram showing another example of orthogonal frequency division multiplexing (OFDM) as utilized to partition the request signal space and the scheduled transmission signal space, with OFDM/TDM request segments and scheduled transmission segments, according to an embodiment of the invention.

FIG. 8 is an illustrative signal diagram showing another example of orthogonal frequency division multiplexing (OFDM) as utilized to partition the request signal space and the scheduled transmission signal space, with OFDM/TDM request segments and scheduled transmission segments, according to an embodiment of the invention. The figure shows a representation of a shared communication medium 500 based on an OFDM structure that includes a request signal space and a scheduled transmission signal space. Separately, the figure shows a feedback signal space 550. The shared communication medium 500 is once again organized into 34 different OFDM frequency channels, labeled as subcarriers −1 through −17 and 1 through 17. Each of these 34 different OFDM frequency channels is further organized into TDM time slots. The DC channel, labeled as subcarrier 0, is left unused.

This example demonstrates that the request signal space and scheduled transmission signal space can be defined in a different way. Again, OFDM frequency channels are used to provide the separation between request signal space and scheduled transmission signal space. However, a different pair of OFDM frequency channels is used here to implement the request signal space. Here, the request signal space comprises OFDM frequency channels −17 and 17. The scheduled transmission signal space comprises OFDM frequency channels −1 through −16 and 1 through 16.

This example also demonstrates that the scheduled transmission segments can be defined as utilizing a different allocation of OFDM frequency channels and TDM time slots. Here, each scheduled transmission segment still comprises a block of 512 data symbols. However, the 512 data symbols span 32 OFDM frequency channels and 16 TDM time slots. FIG. 8 shows four such scheduled transmission segments. The first scheduled transmission segment spans OFDM frequency channels −2 through −17 and 2 through 17 and TDM time slots 0 through 15. The second scheduled transmission segment spans OFDM frequency channels −2 through −17 and 2 through 17 and TDM time slots 16 through 31. The third scheduled transmission segment spans OFDM frequency channels −2 through −17 and 2 through 17 and TDM time slots 32 through 47. The fourth scheduled transmission segment spans OFDM frequency channels −2 through −17 and 2 through 17 and TDM time slots 48 through 63.

FIG. 8 shows the following types of signals allotments: (1) Unoccupied Request Slot, (2) Occupied Request Slot, and (3) Scheduled Transmission Data Burst. In this example, only some of the available request segments are occupied by actual requests sent from one or more access nodes. Thus, some request segments are shown as unoccupied request slots, and others are shown as occupied request slots. Each scheduled transmission segment comprises a block of 512 data symbols referred to here as a data burst.

FIG. 8 presents a number of illustrative requests, as sent from one or more access nodes such as 104, 106, 108, and 110. A request is sent in Slot 4 in OFDM frequency channel −17. Another request is sent in Slot 8 in OFDM frequency channel −17. Another request is sent in Slot 22 in OFDM frequency channel 17. Another request is sent in Slot 33 in OFDM frequency channel −17. Yet another request is sent in Slot 57 in OFDM frequency channel 17.

In response, scheduler node 102 broadcasts assignment messages in feedback signal space 550. As shown in FIG. 8, the first assignment message "REQ −4, SCH 11" indicates that the request sent in Slot 4 in OFDM frequency channel −17 has been assigned to the scheduled transmission segment 11. In this example, a scheduled transmission segment is identified by a sequence number. No sign is used because each scheduled transmission segment spans all OFDM frequency channels, including all positive and negative frequency channels. The sequence number 11 indicates that this scheduled transmission segment is the 11$^{th}$ one in a sequence of scheduled transmissions.

The rest of the assignment messages can be interpreted in a similar way. The second assignment message "REQ −8, SCH 12" indicates that the request segment in Slot 8 in OFDM frequency channel −17 has been assigned to the scheduled transmission segment 12. The third assignment message "REQ +22, SCH 13" indicates that the request segment in Slot 22 in OFDM frequency channel 17 has been assigned to the schedule transmission segment 13. The fourth assignment message "REQ −33, SCH 14" indicates that the request segment in Slot 33 in OFDM frequency channel −17 has been assigned to the scheduled transmission segment 14. The fifth assignment message "REQ +57, SCH 15" indicates that the request segment in Slot 57 in OFDM frequency channel 17 has been assigned to the scheduled transmission segment 15. The assignment messages are broadcast to access nodes 104, 106, 108, and 110, to inform the access nodes of the assignments made, so that each access node may correctly send data in the assigned scheduled transmission segment(s).

FDM Request and Scheduled Transmission

Figure 9:
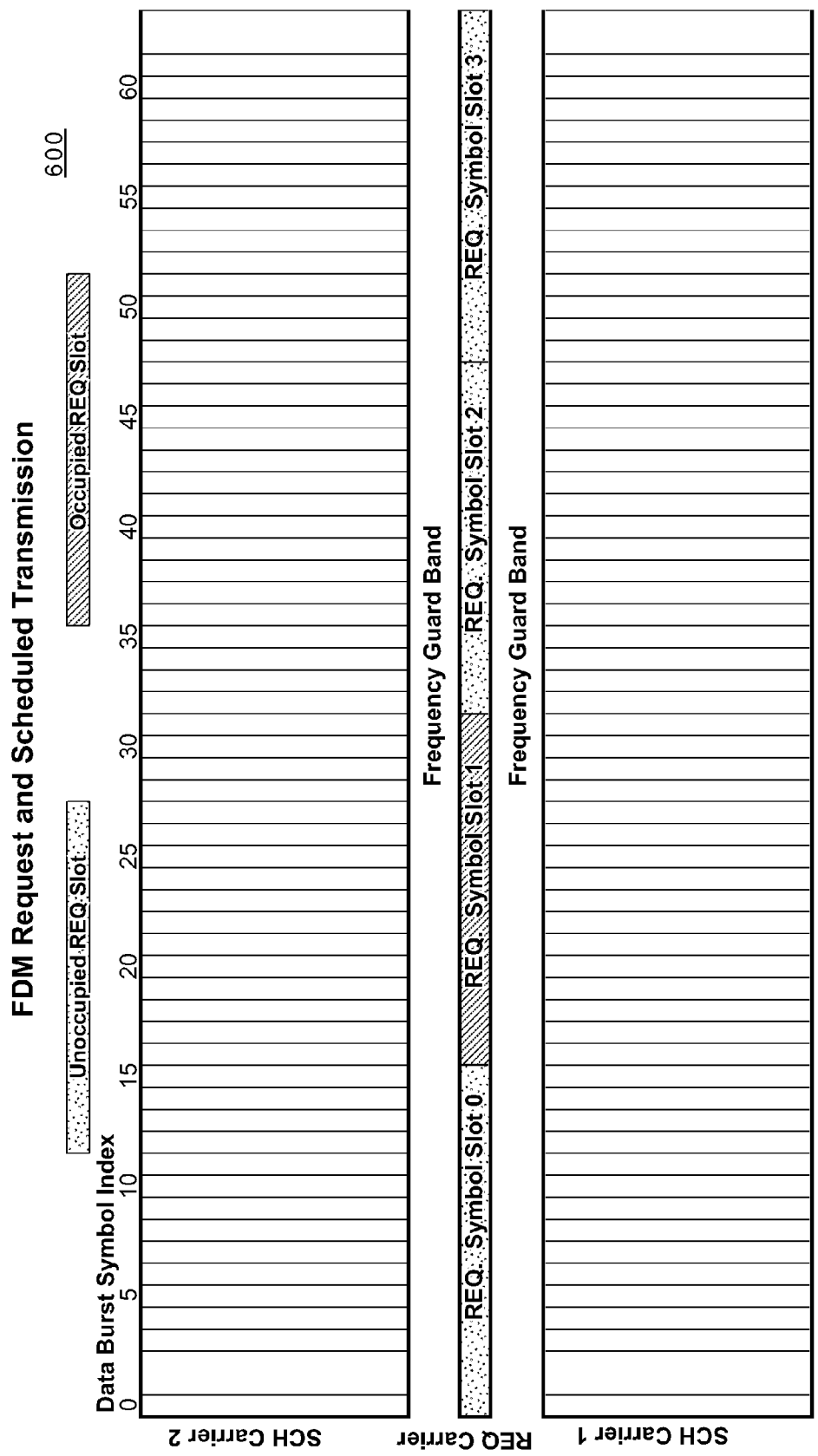
FIG. 9 is an illustrative signal diagram showing frequency division multiplexing (FDM) as utilized to partition the request signal space and the scheduled transmission signal space, with FDM/TDM request segments and scheduled transmission segments, according to an embodiment of the invention.

FIG. 9 is an illustrative signal diagram showing frequency division multiplexing (FDM) as utilized to partition the request signal space and the scheduled transmission signal space, with FDM/TDM request segments and scheduled transmission segments, according to an embodiment of the invention. The figure shows a representation of a shared communication medium 600 based on an FDM structure that includes a request signal space and a scheduled transmission signal space. The request signal space comprises a narrow FDM frequency channel, labeled as REQ Carrier. The scheduled transmission signal space comprises two wide FDM frequency channels, labeled as SCH Carrier 1 and SCH Carrier 2. A feedback signal space is not explicitly shown in this figure but may also be implemented in a manner similar to that described with respect to previous figures.

This example demonstrates that the request signal space and the scheduled transmission signal space may have very different symbol structures. In the request signal space, a symbol is transmitted over the narrow REQ Carrier channel over a longer time duration. These are labeled as REQ Symbol Slots 0, 1, 2, 3, etc. in the figure. By contrast, in the schedule transmission signal space, a symbol is transmitted over one of the two wide SCH Carrier channels over a shorter time duration. These are labeled as Data Burst Symbol 0, 1, 2, 3, . . . , 63, etc. in the figure. Despite this difference in symbol structures, a symbol transmitted in the request signal space may have the same time-bandwidth product as a symbol transmitted in the scheduled transmission signal space, according to an embodiment of the present invention. Thus, FIG. 9 presents request segments based on FDM and TDM, as well as scheduled transmission segments based on FDM and TDM.

FIG. 9 shows the following types of signals allotments: (1) Unoccupied Request Slot and (2) Occupied Request Slot. In this example, only some of the available request segments are occupied by actual requests sent from one or more access nodes. Thus, some request segments are shown as unoccupied request slots, and others are shown as occupied request slots. FIG. 9 also shows scheduled transmission segments. Each scheduled transmission segment comprises a block of N data symbols referred to here as a data burst. Only a portion of the data burst is shown in the figure.

FIG. 9 presents an illustrative request as sent from one or more access nodes such as 104, 106, 108, and 110. The request shown is sent in Slot 1 of the REQ Carrier channel. In response, scheduler node 102 broadcasts assignment messages in feedback signal space (not shown). The assignment messages are broadcast to access nodes 104, 106, 108, and 110, to inform the access nodes of the assignments made, so that each access node may correctly send data in the assigned scheduled transmission segment(s).

Also shown in FIG. 9 are guard zones, specifically frequency guard bands, positioned between various carriers. A first frequency guard band is positioned between the SCH Carrier 1 channel and REQ Carrier channel. A second frequency guard band is positioned between the REQ Carrier channel and the SCH Carrier 2 channel. The use of these guard bands can improve reception and processing of a signal on a particular carrier by providing separation and reduced interference from neighboring carriers.

Figure 10:
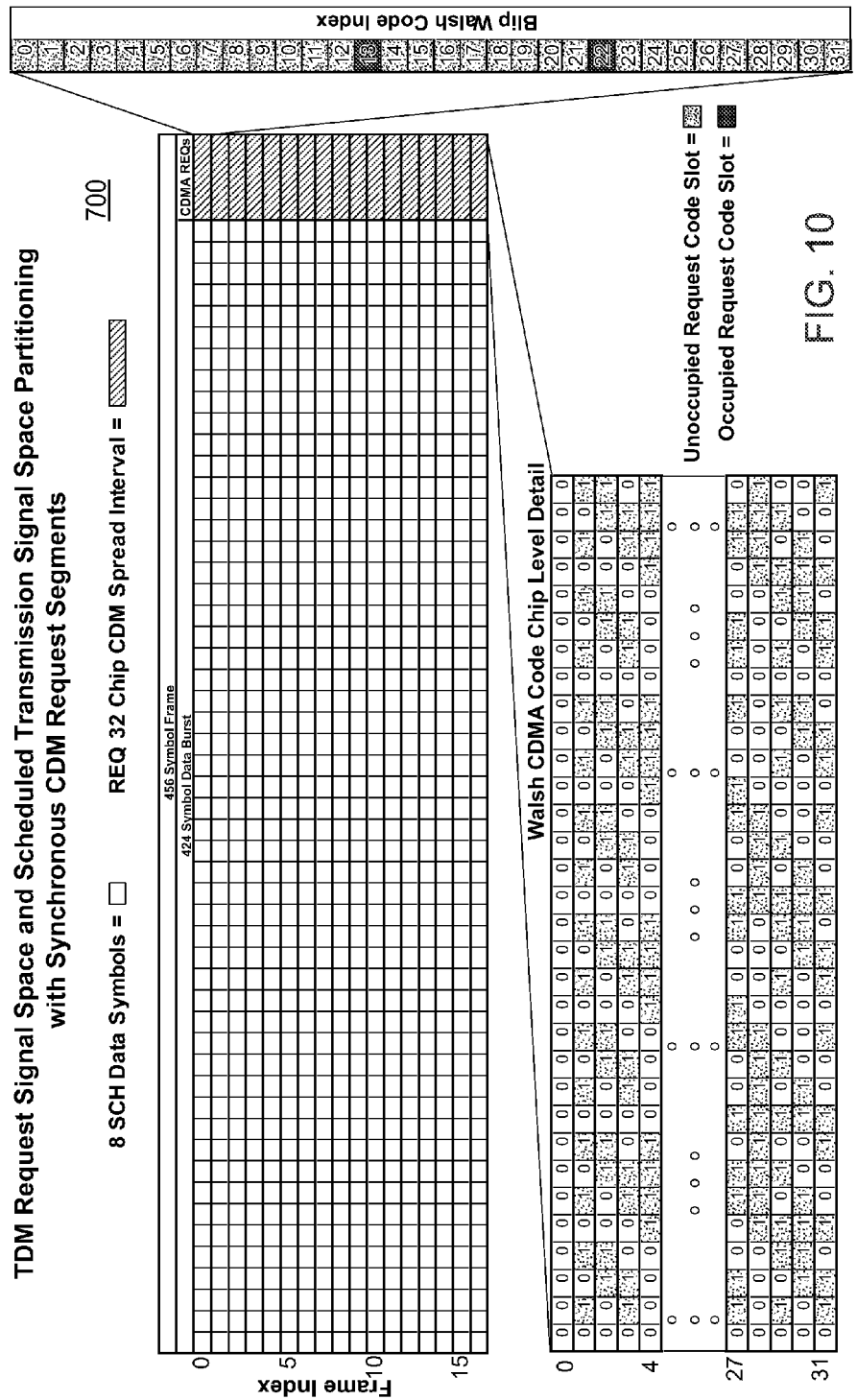
FIG. 10 is an illustrative signal diagram showing time division multiplexing (TDM) as utilized to partition the request signal space and the scheduled transmission signal space, with synchronous CDM request segments, according to an embodiment of the invention.

TDM Request Signal Space and Scheduled Transmission Signal Space Partitioning with Synchronous CDM Request Segments FIG. 10 is an illustrative signal diagram showing time division multiplexing (TDM) as utilized to partition the request signal space and the scheduled transmission signal space, with synchronous CDM request segments, according to an embodiment of the invention. The figure shows a representation of a shared communication medium 700 based on a TDM structure that includes a request signal space and a scheduled transmission signal space. A feedback signal space is not explicitly shown in this figure but may also be implemented in a manner similar to that described with respect to previous figures.

The structure shown in FIG. 10 is based on sequentially ordered frames. Seventeen such frames are shown in this figure, labeled by frame indices 0 through 16. Additional frames may follow. Each frame has a total length of 456 symbols. This total length is divided between a scheduled transmission signal space portion having a length of 424 symbols and a request signal space portion having a length of 32 symbols.

For ease of illustration, the numerous symbols are not individually shown in this figure. Instead, boxes representing multiple symbols are shown. In the transmission signal space, each short box represents 8 scheduled transmission symbols. In the request signal space, each long box represents a 32-chip CDMA request interval. Although the signal segments representing individual chips of any particular CDMA code may be similar in design to the signal segments representing the scheduled transmission symbols, the chips of any particular code are linked in a particular code pattern (e.g., a 32-chip pattern), whereas the scheduled transmission symbols may be individually modulated. As shown, FIG. 10 presents scheduled transmission segments based on TDM and request segments based on CDM.

More specifically, each 456-symbol frame supports 1 scheduled transmission segment and 32 request segments. The 1 scheduled transmission segment comprises the first 424 symbols of the frame. The 32 request segments comprise the 32 possible code words that may be transmitted in the remaining portion of the frame. In other words, the remaining portion of the frame is code division multiplexed and organized as a 32-chip request interval.

Here, a 32-chip Walsh CDMA code is used. In this code space, there exist =different possible code words, each having a length of 32 chips. Indices 0 through 31 are used to identify the 32 different possible code words. FIG. 10 shows the chip-level detail of the 32 code words. Other types and lengths of code may be used in accordance with the invention.

One or more of the access nodes 104, 106, 108, and 110 can send one or more requests (each in the form of one of the 32 possible code words) in a particular request interval. This is illustrated in FIG. 10. In the example shown, two requests are sent in a request interval. The first request is a signal spread according to code word 13. The second request is a signal spread according to code word 22. Thus, code division multiplexing allows the request interval to support 32 request segments, i.e., codes slots. As shown in FIG. 10, two of these request segments are occupied. The remaining thirty request segments are unoccupied.

In FIG. 10, it is assumed that a TDM system is implemented in which all of the nodes are sufficiently time-synchronized, such that no guard zone is needed to separate the scheduled transmission symbols and the request intervals. Even though minor timing offsets may exist between different CDM request signals, the requests are still received and processed with acceptable performance. As such, FIG. 10 refers to a system having "synchronous" CDM request segments.

In response, scheduler node 102 broadcasts assignment messages in feedback signal space (not shown). The assignment messages are broadcast to access nodes 104, 106, 108, and 110, to inform the access nodes of the assignments made, so that each access node may correctly send data in the assigned scheduled transmission segment(s).

Again, the entire request and assignment process takes place in an anonymous manner with respect to the identity of the access nodes. Thus, a symbol-level request sent from an access node does not explicitly identify the access node. For example, assume that access node 104 sends the symbol-level request comprising code word 13. This symbol-level request is merely a signal transmitted at a particular code location within the request symbol space. The symbol-level request does not explicitly identify the access node 104.

Similarly, the corresponding assignment message would not explicitly identify access node 104 as the intended recipient of the assignment message. Instead, the assignment message merely announces that the symbol-level request corresponding to code word 13 in Frame 0 has been assigned to a particular scheduled transmission segment. All of the access nodes 104, 106, 108, and 110 receive the broadcast assignment message. However, only access node 104 accepts the assignment and proceeds to send a data transmission in the scheduled transmission segment identified by the assignment. This is possible because each access node keeps track of the location(s) in code space of the symbol-level request(s) it has sent in each frame. Access node 104 recognizes the request identified in the assignment as one of its own and thus accepts the assignment. The other access nodes 106, 108, and 110 do not recognize the request identified in the assignment as one of their own and thus do not accept the assignment.

Figure 11:
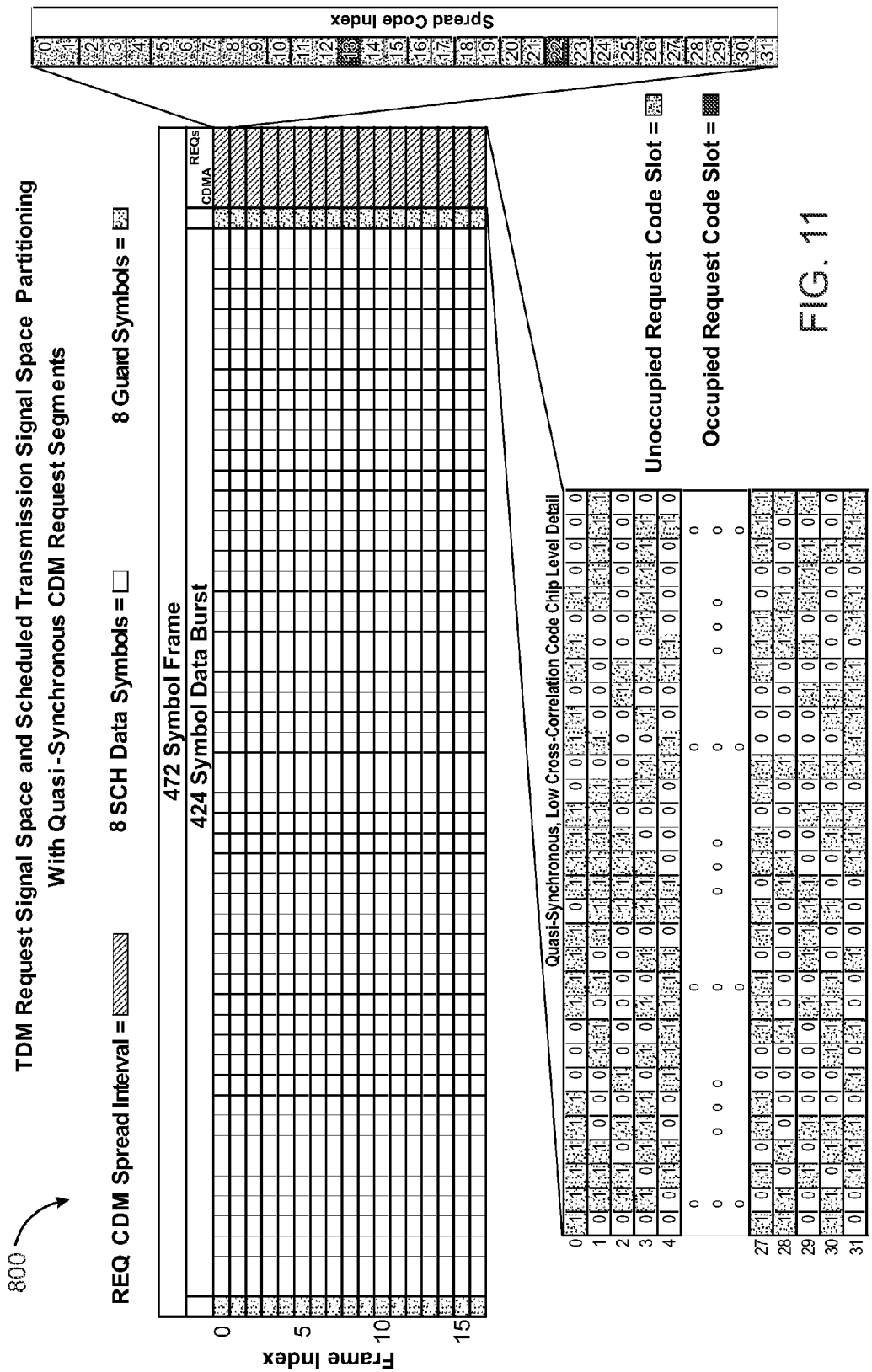
FIG. 11 is an illustrative signal diagram showing time division multiplexing (TDM) as utilized to partition the request signal space and the scheduled transmission signal space, with quasi-synchronous CDM request segments, according to an embodiment of the invention.

TDM Request Signal Space and Scheduled Transmission Signal Space Partitioning with Quasi-Synchronous CDM Request Segments FIG. 11 is an illustrative signal diagram showing time division multiplexing (TDM) as utilized to partition the request signal space and the scheduled transmission signal space, with quasi-synchronous CDM request segments, according to an embodiment of the invention. The figure shows a representation of a shared communication medium 800 based on a TDM structure that includes a request signal space and a scheduled transmission signal space. A feedback signal space is not explicitly shown in this figure but may also be implemented in a manner similar to that described with respect to previous figures.

The structure shown in FIG. 11 is similar to that of FIG. 10, except that 8-symbol guard zones are inserted in each frame to separate the scheduled transmission signal space and the request signal space. The structure is again based on sequentially ordered frames. Seventeen such frames are shown in this figure, labeled by frame indices 0 through 16. Additional frames may follow. Each frame has a total length of 472 symbols. This total length is divided among four different portions of the frame: (1) a guard zone having a length of 8 symbols, (2) a scheduled transmission signal space portion having a length of 424 symbols, (3) another guard zone having a length of 8 symbols, and (4) a request signal space portion having a length of 32 code chips.

For ease of illustration, the numerous symbols are not individually shown in this figure. Instead, boxes representing multiple symbols are shown. In the transmission signal space, each short box represents 8 scheduled transmission symbols. In the request signal space, each long box represents a 32-chip CDMA request interval. For the guard zones, each short box represents 8 guard symbols. Thus, FIG. 11 presents scheduled transmission segments based on TDM and request segments based on CDM.

A 32-chip, low cross-correlation, quasi-synchronous CDMA code is used in this embodiment. When two or more of such codes are not synchronously aligned in time (e.g., they are mis-aligned by a chip), the cross correlation between the codes remains relatively low. Other types and lengths of code may be used in accordance with the invention. One or more of the access nodes 104, 106, 108, and 110 can send one or more requests (each in the form of one of the 32 possible code words) in a particular request interval. In the example shown, two requests are sent in a request interval. The first request is a signal spread according to code word 13. The second request is a signal spread according to code word 22. Thus, code division multiplexing allows the request interval to support 32 request segments, i.e., codes slots. As shown in FIG. 11, two of these request segments are occupied. The remaining thirty request segments are not unoccupied.

In FIG. 11, it is assumed that a TDM system is implemented in which the nodes are not sufficiently time-synchronized, such that guard zones are needed to separate the scheduled transmission symbols and the request intervals. Because of the imperfect time synchronization, different requests received may be time-offset from one another. As a result, energy from immediately adjacent scheduled transmission symbols may interfere with and degrade the proper reception and processing of the requests. By inserting guard zones, the likelihood of such encroachment is reduced, thereby allowing better performance when received requests, such as multiple CDM requests received in a particular request interval, are not precisely synchronized in time. As such, FIG. 11 refers to a system having "quasi-synchronous" CDM request segments.

In response, scheduler node 102 broadcasts assignment messages in feedback signal space (not shown). The assignment messages are broadcast to access nodes 104, 106, 108, and 110, to inform the access nodes of the assignments made, so that each access node may correctly send data in the assigned scheduled transmission segment(s).

Figure 12:
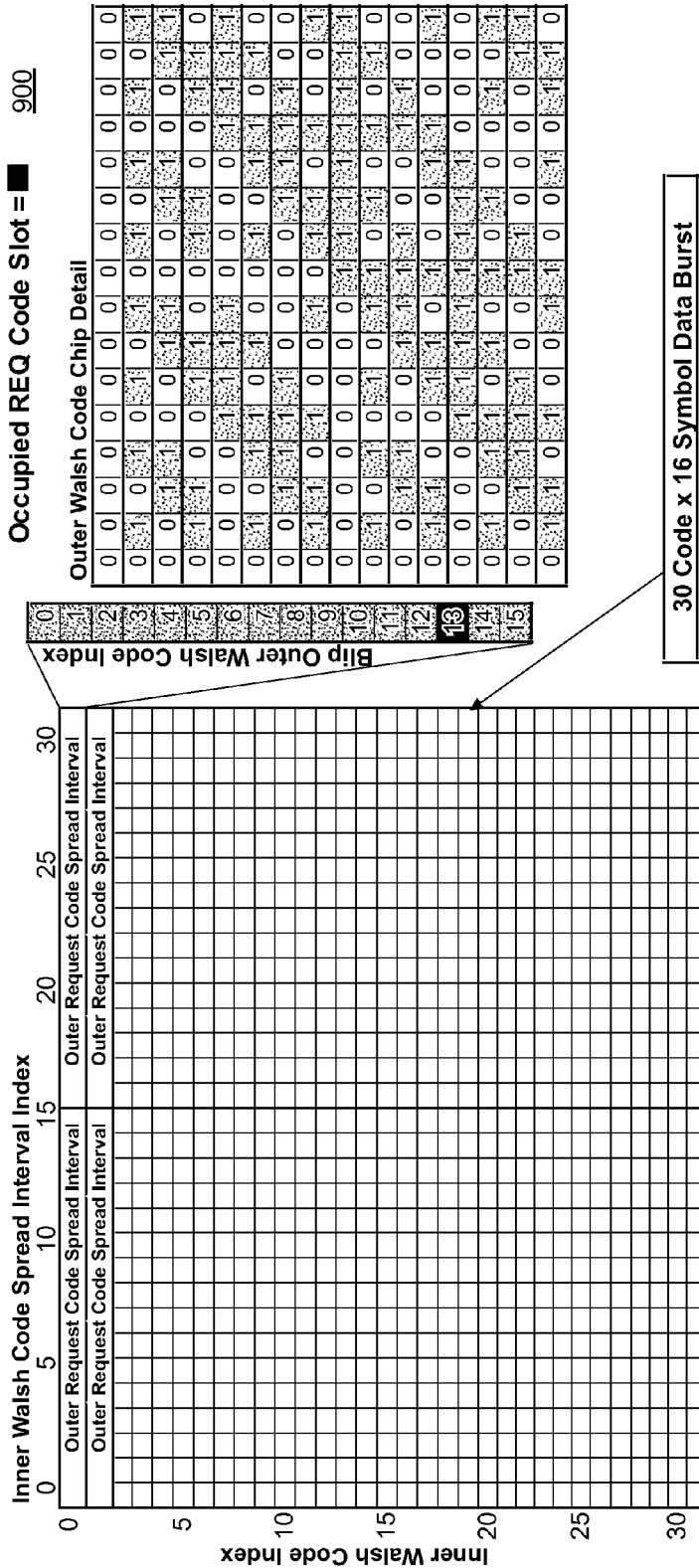
FIG. 12 is an illustrative signal diagram showing code division multiplexing (CDM) as utilized to partition the request signal space and the scheduled transmission signal space, with CDM request segments and CDM scheduled transmission segments, according to an embodiment of the invention.

TDM Request Signal Space and Scheduled Transmission Signal Space Partitioning with Synchronous CDM Request Segments FIG. 12 is an illustrative signal diagram showing code division multiplexing (CDM) as utilized to partition the request signal space and the scheduled transmission signal space, with CDM request segments and CDM scheduled transmission segments, according to an embodiment of the invention. The figure shows a representation of a shared communication medium 900 based on a concatenated CDM structure that utilizes an inner code and an outer code to support a request signal space and a scheduled transmission signal space. A feedback signal space is not explicitly shown in this figure but may also be implemented in a manner similar to that described with respect to previous figures.

The structure shown in FIG. 12 is based on sequentially ordered frames. Two such frames are shown in this figure. Frame #1 comprises the block of signal space covering "Inner Walsh Code Index" 0 through 31 and "Inner Walsh Code Spread Interval Index" 0 through 15. Frame #2 comprises a block of the signal space covering "Inner Walsh Code Index" 0 through 31 and "Inner Walsh Code Spread Interval Index" 16 through 31. The frames have similar formats. As such, Frame #1 is described in detail below as an illustrative example.

Frame #1 contains 16 time slots (corresponding to the 16 columns of Frame #1 shown in FIG. 12). Each time slot represents an inner code interval of 32 chips. A detailed view of one such 32-chip inner code interval is shown at the bottom of FIG. 12. Here, an "inner code" is employed to multiplex each time slot into 32 "inner code channels," one for each code word. The 32 "inner code channels" are shown as the 32 rows of Frame #1 in FIG. 12. Here, a 32-chip Walsh code having 32 different possible code words is used.

Thus, instead of transmitting a single symbol in each time slot, up to 32 different code symbols can be transmitted in each time slot. Each code symbol comprises a particular 32-chip inner code word, modulated by the data value that is to be sent. For example, the 32-chip code word for a particular inner code channel may be [0, 0, 0, . . . , 0]. Here, modulating this inner code word with a data value of "0" results in a 32-chip code symbol of [0, 0, 0, . . . , 0]. Modulating the same inner code word with a data value of "1" results in a 32-chip code symbol of [1, 1, 1, . . . , 1]. As mentioned above, Frame #1 contains 16 time slots, and each time slot supports 32 different code symbols (corresponding to 32 inner code channels). Thus, Frame #1 supports 512 code symbols.

The multiplexing provided by the "inner code channels" is used to partition Frame #1 into a portion of request signal space and a portion of scheduled transmission signal space. As shown in FIG. 12, Frame #1 includes 32 inner code channels labeled as "Inner Walsh Code Index" 0 through 32. The first two code channels, 0 and 1, are designated as the request signal space portion. The remaining thirty code channels, 2 through 31, are designated as the scheduled transmission portion. Thus, each frame supports a scheduled transmission segment comprising 480 code symbols (30 inner code channels×16 time slots). In other words, 480 of the 512 code symbols in Frame #1 are use as part of the scheduled transmission segment.

The request signal space, comprising (1) a first "Outer Request Code Spread Interval" inner code channel 0 and (2) a second "Outer Request Code Spread Interval" in code channel 1, is further multiplexed using an "outer" code. The outer code has a code length of 16 chips and spans 16 time slots. That is, each chip of the 16-chip outer code spans an entire time slot. Here, a Walsh code having 16 different possible code words and a length of 16 chips is used. As a result, each "Outer Request Code Spread Interval" is further multiplexed, into 16 "outer code channels." Each of these outer code channels represents a unique request segment in the request signal space. Frame #1 has two such "Outer Request Code Spread Intervals." Accordingly, Frame #1 supports a total of 32 different request segments.

Given this structure, each request signal is transmitted using a certain 16-chip outer code word and a certain 32-chip inner code word. Furthermore, each request signal spans 16 time slots. In each time slot, a particular "chip" of the 16-chip outer code word modulates an entire 32-chip inner code word. Just as a simple example, the 32-chip inner code word may be [0, 1, 0, 1, . . . , 0, 1]. Here, modulating this inner code word with an outer code word "chip" having a value of "0" produces a request signal portion [0, 1, 0, 1, ..., 0, 1]. Modulating the same inner code word with an outer code word "chip" having a value of "1" produces a request signal portion [1, 0, 1, 0, ..., 1, 0].

One or more of the access nodes 104, 106, 108, and 110 can send one or more requests. Each request can be sent in one of the 32 different request segments in a frame. In the example depicted in FIG. 12, a request in Frame #2 is sent in the request segment shown as inner code channel 0 and outer code channel 13.

In response, scheduler node 102 broadcasts assignment messages in feedback signal space (not shown). The assignment messages are broadcast to access nodes 104, 106, 108, and 110, to inform the access nodes of the assignments made, so that each access node may correctly sesnd data in the assigned scheduled transmission segment(s).

Orthogonal and Non-Orthogonal Request Signal Designs

According to an embodiment of the invention, the request segments may be positioned such that adjacent request segments may represent orthogonal portions of the request signal space. Adjacent request segments may refer to request segments that are located next to one another in time, frequency, and/or code space. Here, orthogonal portions of a signal space refer to allotments within the signal space that are designed to be separable from one another, at least under ideal conditions. For request segments defined based on frequency division multiplexing, such orthogonal requests may be achieved by implementing adjacent request segments as non-overlapping frequency channels. For request segments defined based on time division multiplexing, such orthogonal requests may be achieved by implementing adjacent request segments as non-overlapping time slots. For request segments defined based on code division multiplexing, such orthogonal requests may be achieved by implementing adjacent request segments using orthogonal codes, such as Walsh codes as described in previous sections, Walsh codes combined with a common pseudo noise (PN) sequence using modulo 2 addition (Walsh codes with common PN sequence overlay), Gold codes, and others.

According to an embodiment of the invention, the request segments may be positioned such that adjacent request segments may represent non-orthogonal portions of the request signal space. Here, non-orthogonal portions of a signal space refer to allotments within the signal space that are designed to be only partially separable from one another. For request segments defined based on frequency division multiplexing, such non-orthogonal requests may be achieved by implementing adjacent request segments as partially-overlapping frequency channels. For request segments defined based on time division multiplexing, such non-orthogonal requests may be achieved by implementing adjacent request segments as partially-overlapping time slots. For request segments defined based on code division multiplexing, such orthogonal requests may be achieved by implementing adjacent request segments using non-orthogonal codes.

A disadvantage associated with use of non-orthogonal request segments is the reduction in reception performance. When partially-overlapping frequency channels, partially-overlapping time slots, and/or non-orthogonal codes are used, the reception of particular request segment might capture some energy from adjacent request segment(s), thus reducing reception performance. On the other hand, an advantage associated with the use of non-orthogonal request segments is that it allows for a more densely packed request signal space. That is, more request segments can be packed into a given request signal space.

According to various embodiments of the invention, the extent of non-orthogonality is selected for a particular balance of such advantages and disadvantages. In one example, non-orthogonal, time-division multiplexed request segments may be implemented as 1 msec time slots, spaced ½ msec apart. That is, each time slot has a length of 1 msec. However, the time slots are arranged to overlap one another, such that a new time slot starts every ½ msec. Thus, adjacent time slots have a ½ msec overlap region. This particular balance is presented as one example and can be adjusted. The amount of overlap can be increased (e.g., to greater than ½ msec), which achieves an even more densely packed request signal space but further degrades reception performance. Alternatively, the amount of overlap can be decreased (e.g., to less than ½ msec), which achieves a less densely packed request signal space but improves reception performance. The level of non-orthogonality can be similarly adjusted for request segments based on frequency division multiplexing (by adjusting overlapping frequency channels) and code division multiplexing (by selecting different non-orthogonal codes).

Furthermore, different combinations of multiplexing type and non-orthogonality technique can be employed. For example, request segments may be based on a code division multiplexing employing non-orthgonal codes and overlapping time slots. This may be implemented, for instance, using non-orthogonal codes defined over 32 msec code intervals (time slots) spaced 16 msec apart. Thus, adjacent code intervals have a 16 msec overlap region. In such a case, non-orthogonality is attributed to the use of both non-orthogonal codes and overlapping time slots. As another example, request segments may be based on code division multiplexing employing non-orthogonal codes and a common code interval. In such a case, non-orthogonality is attributed only to the use of non-orthogonal codes.

Robust FIFO Scheduling and Efficient FIFO Scheduling

FIG. 5 and other figures depict an assignment message under a "robust FIFO schedule mode," in accordance with one embodiment of the invention. As mentioned previously, in this mode, each assignment message explicitly includes a pair of data: (1) an identifier for the request and (2) an identifier for the scheduled transmission segment associated with the request. In other words, the pairing of a request to an associated scheduled transmission segment is directly stated in the assignment message. For example, as shown in FIG. 5, the first assignment message includes the pair of data "REQ 0:7, SCH 13." This indicates that the request sent in the request segment known as "REQ 0:7" (the request segment located at Frame 0, Slot 7) has been assigned the scheduled transmission segment known as "SCH 13" (the scheduled transmission segment located in Frame 13).

Processing of a message under the "robust FIFO schedule mode" by an access node such as 104, 106, 108, and 110 is described below, according to one embodiment. Here each access node maintains a local data transmission queue based on assignment messages received at the first node. The local data transmission queue may be a first-in-first-out (FIFO) list of all symbol-level-requests from all access nodes that have been assigned to scheduled transmission segments, arranged in the order of transmission. Each entry in the queue may contain not only an identifier for a symbol-level request, but also an identifier for the corresponding scheduled transmission segment. The local data transmission queue is synchronized to the timing of the rest of the system. Thus, as each transmission occurs or is about to occur, the access node examines the corresponding entry in the local data transmission queue. If the access node recognizes the entry as being associated with a symbol-level request sent from the access node, the access node knows that its turn has come and sends its pending data transmission. If the access node does not recognize the entry as being associated with a symbol-level request set from the access node, the access node can assume that it is another access node's turn, and does not send a data transmission.

The assignment message may take on a different format under an "efficient FIFO schedule mode," in accordance with an alternative embodiment of the invention. In this mode, each assignment message may only include one piece of data: an identifier for the request. The scheduled transmission segment associated with each request is not directly stated in the assignment message. Instead, the scheduled transmission segment associated with each request is inferred.

Processing of a message under the "efficient FIFO schedule mode" by an access node such as 104, 106, 108, and 110 is described below, according to one embodiment. Again, each access node maintains a local data transmission queue based on assignment messages received at the first node. The local data transmission queue may be a first-in-first-out (FIFO) list of all symbol-level-requests from all access nodes that have been assigned to scheduled transmission segments, arranged in the order of transmission. Each entry in the queue may contain just an identifier for a symbol-level request. The local data transmission queue is synchronized to the timing of the rest of the system. Thus, as each transmission occurs or is about to occur, the access node examines the corresponding entry in the local data transmission queue. If the access node recognizes the entry as being associated with a symbol-level request sent from the access node, the access node knows that its turn has come and, sends its pending data transmission. If the access node does not recognize the entry as being associated with a symbol-level request set from the access node, the access node can assume that it is another access node's turn, and does not send a data transmission.

Because a message under the "efficient FIFO schedule mode" does not contain an identifier for the scheduled transmission segment associated with the request, it may be more difficult to keep each access node such as 104, 106, 108, and 110 in synchronization with the rest of the system. For example, if an access node misses an assignment message for some reason, the local data transmission queue maintained at the access node may become out of sync with the actual timing of data transmissions. To address this potential problem, scheduler node 102 may periodically broadcast synchronization messages to the access nodes. This allows each access node to synchronize its local data transmission queue with the data transmission queue maintained at scheduler node 102.

Request Detection Error Processing

Undetected requests are handled by request retransmission, according to an embodiment of the invention. Here, an access node such as 104, 106, 108, and 110 may transmit a symbol-level request that is not detected by the intended recipient, such as scheduler node 102. A variety of factors may contribute to such a missed detection, such as noise, interference, etc. When the access node senses that a symbol-level request it has sent has not been responded to (e.g., no assignment message is received from the scheduler node 102 in response to the symbol-level request), the access node may retransmit the symbol-level request. The retransmission technique may also take into account considerations such as retransmission count, latency, and quality of service (QOS). For example, the access node may keep track of a retransmission count, such as the number of times a particular request has been retransmitted. If the retransmission count exceeds a maximum threshold, the request may be discarded so that no further retransmission is attempted. Also, the access node may keep track of a measure of latency, such as the amount of time that has elapsed since the access node began attempting to request a scheduled transmission segment for a particular message. If the latency exceeds a maximum threshold, the request may be discarded so that no further retransmission is attempted. Furthermore, the access node may take into account a measure of QOS for a request. If the request is associated with a higher QOS, the request may be given a higher priority in retransmission.

Request collisions detected by scheduler node 102 may be treated in a similar manner as undetected requests, according to an embodiment of the invention. Here, two or more symbol-level requests sent from different access nodes such as 104, 106, 108, and 110 may collide with one another. Such collisions may occur if the two or more symbol-level requests are sent in the same request segment. If scheduler node 102 detects such a collision, it may simply not send an assignment. Thus, the response from scheduler node 102 is the same, regardless of whether scheduler node 102 misses the symbol-level request or detects that the symbol-level request was involved in a collision. That is, scheduler node 102 does not send an assignment.

Accordingly, the access node does not need to distinguish between an undetected request versus a detected request collision. As long as the access node senses that a symbol-level request it has sent has not been responded to (e.g., no assignment message is received from scheduler node 102 in response to the symbol-level request), the access node may retransmit the symbol-level request. Again, the retransmission technique may take into account various considerations such as those listed above.

Request collisions not detected by scheduler node 102 as a collision may need to be handled differently. Here, two or more symbol-level requests collide. However, scheduler node 102 fails to recognize that a collision has occurred. Instead, scheduler node 102 treats the collision as a valid symbol-level request. Thus, scheduler node 102 sends an assignment message associating the symbol-level request to a scheduled transmission segment. Each access node that sent a symbol-level request involved in the collision accepts this assignment, and in response sends its own data transmission. As a result, a collision of multiple data transmissions can occur in the scheduled transmission segment specified in the assignment.

The system may handle such a scenario in a number of ways. In one embodiment of the invention, receipt of the data transmission is not to be acknowledged. For example, when an access node such as 104, 106, 108, and 110 sends a data transmission in an assigned scheduled transmission segment, the access node does not expect the intended recipient to respond by sending an acknowledgement (ACK) message to confirm successful receipt of the data transmission. Here, the access node does not inquire into whether the data transmission is successfully received. If it is not successfully received, the access node does not take any action to re-send the data transmission.

In an alternative embodiment of the invention, receipt of the data transmission is to be acknowledged. For example, when an access node such as 104, 106, 108, and 110 sends a data transmission in an assigned scheduled transmission segment, the access node expects the intended recipient to respond by sending an acknowledgement (ACK) message to confirm successful receipt of the data transmission. Here, if the data transmission is not successfully received, as indicated by the lack of an ACK message from the intended recipient, the access node re-sends the data transmission. The process of re-sending the data transmission may be similar to that of the original transmission. That is, the access node may first send a symbol-level request, then receive an assignment associating the symbol-level request to a particular scheduled transmission segment, and finally send the data transmission in the assigned scheduled transmission segment.

Contention Requests

According to an embodiment of the present invention, when an access node such as 104, 106, 108, and 110 sends a symbol-level request, the access node randomly selects a request segment from the plurality of available request segments. As mentioned previously, the request segments may be organized in the request signal space based on time-division multiplexing, frequency-division multiplexing, code-division multiplexing, and/or other multiplexing techniques.

For example, the request segments can be organized in the request signal space based on code-division multiple access (CDM). A code such as a Walsh code may be used. Each request segment corresponds to a code channel that can be extracted from the request signal space by applying a particular code word. By utilizing CDM, the request segment is extended in time and spread in frequency. That is, without applying code-division multiple access, the request segment may be confined to a shorter time slot and narrower frequency bandwidth. Thus, the energy of a request can be spread out over a longer time slot and over a wider frequency bandwidth. This allows the transmitter to use less power. Specifically, the arrangement captures the otherwise unused power (power in unoccupied time slots and unoccupied frequency bandwidths) in a low load factor request channel. Use of CDM in the request signal space also provides a signal-to-noise ratio (SNR) gain over transmissions in the scheduled transmission signal space. In certain implementations, this gain can be in the range of 9 to 30 dB, or even more. The use of CDM as applied to request segments can significantly improve request detection performance.

FIG. 13 presents a more detailed example of a system with a contention code request channel, according to an embodiment of the invention. Here, the system utilizes a scheduled transmission data length of 800 channel symbols, which is equivalent to 100 bytes in this case. The average interval of scheduled transmissions from each node is 8 seconds. The average bandwidth of scheduled transmissions from each node is 100 symbols/sec. The ratio of request symbols to scheduled transmission symbols is 8/100. In other words, every 64 request symbols corresponds to 800 scheduled transmission symbols. A 64 chip spread code is used is that provides a 18 dB SNR spread gain. The request channel load factor is 1/64. The resulting collision probability of requests is 1.55%.

Polled Requests

According to another embodiment of the present invention, when an access node such as 104, 106, 108, and 110 sends a symbol-level request, the access node utilizes a defined schedule to select a request segment from the plurality of available request segments. The defined schedule specifies the request segments available to each access node. In this sense, the defined schedule "polls" each access node to send its request in the appropriate request segment. Again, the request segments may be organized in the request signal space based on time-division multiplexing, frequency-division multiplexing, code-division multiplexing, and/or other multiplexing techniques. In particular, the use of code-division multiplexing in the request signal space is associated with significant benefits, as discussed previously.

Generally speaking, a polled request channel has both advantages and disadvantages when compared to a contention request channel. One advantage is that there is no possibility of collision. This is because the defined schedule does not allot the same request segment to two different access nodes. A disadvantage of the polled request channel is added latency. When an access node adopting a polled request channel is ready to send a request, it might not be able to do so right away. Instead, the access node may have to wait for the next opportunity when one of its request segments becomes available according to the defined schedule. Such delays contribute to the added latency of a polled request channel.

According to one embodiment of the invention, the defined schedule is fixed. For example, the nodes in the system may be preprogrammed to follow a particular defined schedule of request segments. According to another embodiment of the invention, the defined schedule is dynamically altered. For example, the scheduler node 102 may change the defined schedule of requests segments during operation, in response to changing conditions. The scheduler node 102 may then broadcast the newly defined schedule to access nodes 104, 106, 108, and 110.

FIG. 14 presents a more detailed example of a system with a polled code request channel, according to an embodiment of the invention. Here, the system utilizes a scheduled transmission data length of 800 channel symbols, which is equivalent to 100 bytes in this case. The average interval of scheduled transmissions from each node is 8 seconds. The average bandwidth of scheduled transmissions from each node is 100 symbols/sec. The request poll interval for each node is set at 125 msec, which corresponds to 8 request opportunities per second per node. The ratio of request symbols to scheduled transmission symbols is 8/100. In other words, every 64 request symbols corresponds to 800 scheduled transmission symbols. A 64 chip spread code is used is that provides a 18 dB SNR spread gain. The collision probability of requests is 0% if the system operates as intended.

Request Signal Designs for Multiple Service Types

According to an embodiment of the present invention, multiple services are offered. Accordingly, multiple categories of scheduled transmission segments are defined in the scheduled transmission signal space. Each category of scheduled transmission segments may correspond to a different service type. For example, as described previously, FIG. 6 presents a two-service TDM request and scheduled transmission scheme. In this case, there are two categories of scheduled transmission segments: long request segments for data transmissions of a first length (long) and short request segments for data transmissions of a second length (short). FIG. 6 merely illustrates a simple example. The service types may be based on factors other than data transmission length. Also, there may be more than two types of service.

To request a scheduled transmission of a particular service type, an access node such as 104, 106, 108, and 110 sends a request that somehow indicates the service type desired. According to various embodiments of the invention, such a request may be implemented as a one-symbol (single symbol) request or an N-symbol (multiple symbols) request.

One-symbol requests are described in more detail below. Here, the access node conveys the service type desired using only a one-symbol request. According to an embodiment of the invention, this is accomplished by dividing the request signal space into multiple categories of request segments. An access node can indicate the type of service requested by sending the request in a request segment belonging to the appropriate category. For example, in the case of two-service system shown in FIG. 6, some request segments are designated as "long" request segments, while other request segments are designated as "short" request segments. To request a "long" scheduled transmission, an access node such as 104, 106, 108, and 110 simply sends a request in one of the "long" request segments. Such a technique has numerous advantages. One is that multiple service types (e.g., greater than two) can be supported. Another is that a flexible allocation of the request signal space to different service types can be achieved. For example, in the two-service system shown in FIG. 6, the make-up of the request signal space, in terms of allocation for "long" request segments versus allocation for "short" request segments, can be flexibly changed. Furthermore, this make-up of the request signal space can be dynamically adjusted while the system is in operation.

N-symbol requests are described in more detail below. Two separate embodiments are presented. According to a first embodiment, a request comprising N symbols is non-coherently detected. That is, the recipient of the request (e.g., scheduler node 102, other access nodes such as 104, 106, 108, and 110) receives the request as a non-coherent signal. For example, the recipient may utilize an envelope detector that only detects each symbol of the request as either an "on" or "off." Generally speaking, such an N-symbol request can specify one out of $2^N-1$ service types. In one implementation where each request comprises N=2 symbols, the request may support 3 different types of services as follows. If symbol 1 is "on" and symbol 2 is "off," then service type 1 is indicated. If symbol 1 is "off" and symbol 2 is "on," then service type 2 is indicated. If symbol 1 is "on" and symbol 2 is "on," then service type 3 is indicated. Of course, if symbol 1 is "off" and symbol 2 is "off," then no request is sent.

Figure 15:
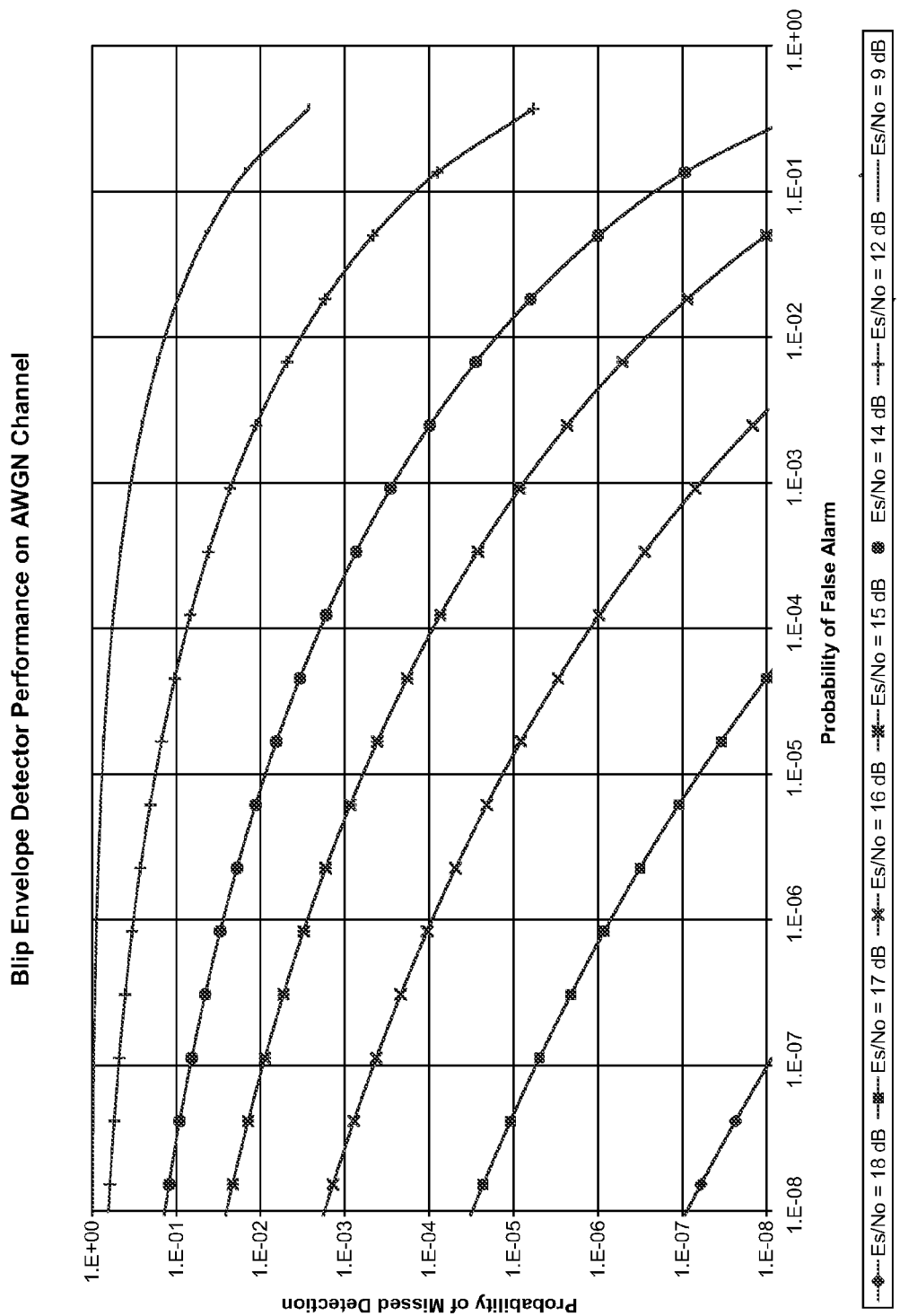
FIG. 15 is a plot of expected envelop detector performance under different noise levels, according to an embodiment of the invention.

FIG. 15 is a plot of expected envelop detector performance under different noise levels, according to an embodiment of the invention. According to various embodiments of the invention, an envelop detector may be implemented to detect requests sent in the request signal space. This includes detection of one-symbol requests as well as N-symbol requests, as discussed above. Designs of such envelop detectors are well-know in the art. FIG. 15 shows a number of performance curves, known in the art as receiver operating characteristic (ROC) curves. Each curve represents the expected performance of the envelop detector for a particular noise level, which is expressed in terms of a ratio of energy per symbol over noise (Es/No). Each curve demonstrates the trade off that can be expected at a particular noise level between (1) probability of missed detection and (2) probability of false alarm for the detector. Adjusting the detection threshold of the detector moves the performance of the detector along the curve. Any point on the curve represents a particular tradeoff between probability of missed detection and probability of false alarm. As can be expected, the overall performance of the envelop detector degrades as noise level increases.

According to a second embodiment, a request comprising N symbols is coherently detected. That is, the recipient of the request receives the request as a coherent signal. Designs of such coherent detectors are well-know in the art. The recipient may demodulate the request according to a particular modulation and/or coding scheme. One example is a system based on a differentially coherent detection scheme. Here, M-ary differential phase shift keying (M-DPSK) modulation is used. An N-symbol request can specify one of $M^{N-1}$ different service types, with one symbol used to provide a phase reference. Furthermore, the M-DPSK signal may also be block-coded to provide error correction. Of course, this is just one example. In other implementations, different modulation and coding schemes may be used. The particular choice of modulation and coding scheme may be depend on channel conditions, such as the signal to noise ratio (SNR) encountered.

Default Assignment of Scheduled Transmission Segments

According to an embodiment of the invention, the scheduled transmission signal space comprises a plurality of scheduled transmission segments that includes at least one default use segment available for use by a default node or a plurality of default nodes if not assigned to any symbol-level request. Such a technique allows for a flexible use of transmission segments that do not become assigned as a result of a specific symbol-level request.

In one implementation, a two-tier assignment technique is employed. The first tier is a "priority tier" of assignments. This may comprise an assignment associating a symbol-level request with a scheduled transmission segment, as discussed in other sections of the present disclosure. A second tier is a "space available" tier of assignments. In this tier, one or more scheduled transmission segments are assigned to a default entity. The default entity is given conditional use of these scheduled transmission segments. The condition is that, if the scheduled transmission segments are not assigned in the priority tier (thus they are available), the default entity may go ahead and use the scheduled transmission segments. In other words, the second tier allows for secondary assignments of scheduled transmission segments.

Each of these second-tier assignments may be specified for a particular time duration. Typically, the time duration is relatively long with respect to the first-tier assignment activities of the system. Just as one example, in a particular system, numerous first-tier assignments may take place in a matter of seconds. By contrast, a second-tier assignment may assign one or more scheduled transmission segments to a default entity for a time duration of minutes, hours, or days. Also, the second-tier assignments may partition the scheduled transmission signal space in a different way than the first tier of assignments. For example, a second-tier assignment may assign a large block of scheduled transmission segments for default use by a default entity.

In one embodiment, the default entity comprises a default node. Here, the default node enjoys use of the one or more scheduled transmission segments if they are not assigned in the first tier. The default node may use the scheduled transmission segments to perform file transfers, certain low priority data flows, etc.

In another embodiment, the default entity comprises a group of default nodes. Here, the group of default nodes shares the default use of the one or more scheduled transmission segments. The scheduled transmission segments may be allocated as a block of the signal space. The group of default nodes may share the default use of the block on a contention basis. For example, each member of the group of default nodes may compete with the other members for the right to use the entire block of signal space. Various contention access protocols may be implemented, such as Slotted Aloha and others.

In yet another embodiment, the default entity is selected from a plurality of default entities including at least one default node and at least one group of default nodes. Thus, in one system, the second tier may include a mix of default nodes and groups of default nodes. A particular second-tier assignment may assign the default use of a block of signal space to a default node or to a group of default nodes.

Successive Scheduled Requests

In response to an initial symbol-level request sent in an initial request segment from access nodes 105, 106, 108, and 110, scheduler node 102 may assign one or more additional request segments as follow-up request segments to the initial symbol-level request, according to an embodiment of the invention. For example, scheduler node 102 may broadcast an assignment message to associate the initial request segment with the one or more follow-up request segments. This may be performed in an anonymous manner with respect to the identity of the access node that sent the initial request, as described previously. The one or more scheduled follow-up request segments may be used in different ways. Two such uses are described below.

In one embodiment, the follow-up request segments are used to resolve collisions. When scheduler node 102 receives the initial symbol-level request, it may determine that a collision may have occurred. Just as an example, assume two access nodes, 104 and 106, each sends an initial request in the same initial request segment. This causes a collision. Even if scheduler node 102 can properly decode the initial request, it remains ambiguous as to which access node should be the deemed the originator of the request. If scheduler node 102 does not resolve the collision and instead simply sends an assignment message associating the initial request with a scheduled transmission segment, both access nodes 104 and 106 may accept the assignment and attempt to send a data transmission in the scheduled transmission segment. The likely result is that the signals will be jumbled, and neither data transmission can be properly received.

Thus, instead of just sending an assignment associating the initial request segment with a scheduled transmission segment, scheduler node 102 may send an assignment associating the initial request segment with one or more follow-up request segments. These follow-up request segments provide an opportunity for access nodes involved in a collision to send secondary requests that may avoid collision with one another.

Continuing with the above example of a collision involving access nodes 104 and 106, scheduler node 102 may detect the possible collision and send an assignment that associates the initial request with 32 follow-up request segments. Access node 104 responds by randomly selecting 1 out of the 32 follow-up request segments and sending a secondary request in its randomly selected request segment (e.g., request segment 8). Access node 106 also responds by randomly selecting 1 out of the 32 follow-up request segments and sending a secondary request in its randomly selected request segment (e.g., request segment 13).

There is a high probability (31/32) that access nodes 104 and 106 would randomly select different ones of the 32 possible follow-up request segments to send their respective secondary requests. If this scenario occurs (more likely), the collision has been resolved. That is, now access nodes 104 and 106 have sent secondary requests in distinct request segments. Scheduler node 102 can simply process the secondary requests separately—by assigning a scheduled transmission segment to the secondary request sent from access node 104, and separately assigning another scheduled transmission segment to the secondary request sent from access node 106.

Of course, there is a low probability (1/32) that access nodes 104 and 106 would happen to select the same one out of the 32 possible follow-up segments to send their respective secondary requests. If this scenario occurs (less likely), the collision remains unresolved. Here, scheduler node 102 may repeat the procedure over again, in order to resolve the collision. That is, scheduler node 102 may send yet another assignment to assign another set of 32 follow-up request segments. Access nodes 104 and 106 would again separately make random selections out of the 32 follow-up request channels, and so on. This process may repeat until the collision is resolved or until a termination condition is reached.

While the example discussed above involves two access nodes 104 and 106, the approach is applicable in collision situations involving more than two nodes. Also, the probability of collision resolution in each iteration can be modified by changing the number of follow-up request segments assigned (e.g., to a number greater than or less than 32).

In another embodiment, the follow-up request segments are used to send additional information relating to a request. An access node such as 104, 106, 108, and 110 may send an initial symbol-level request. Upon receiving the initial symbol-level request, scheduler node 102 may send an assignment associating the initial request segment with one or more follow-up request segments. Here, the follow-up request segments provide an opportunity for the access node to provide additional information that supplements the initial symbol-level request. For example, if the initial symbol-level request does not indicate a particular type of service requested, scheduler node 102 may assign one or more follow-up request segments so that the access node may send additional signals in the follow-up request segments to specify the type of service requested.

Piggyback Requests

According to an embodiment of the invention, a request may be sent from an access node such as 104, 106, 108, and 110 as a "piggyback request." Here, a piggyback request refers to a request that is included in a portion of a data transmission sent from a node in a scheduled transmission segment. Thus, unlike a request sent in a request segment in the request signal space, a piggyback request is sent as part of a data transmission, such as in a header of the data transmission, sent in a scheduled transmission segment in the scheduled transmission signal space. This technique may improve efficiency by allowing a request to "hitch a ride" on a scheduled transmission, thus obviating the use a separate transmission in the request signal space.

Operation of piggyback requests can be viewed in the context of a sequence of data transmissions sent, in respective scheduled transmission segments, from an access node. The sequence of data transmissions may include a current data transmission that the access node is prepared to send. The sequence of data transmissions may also include a subsequent data transmission that has yet to be assigned a scheduled transmission segment. To request a scheduled transmission segment for the subsequent data transmission, the access node may send a piggyback request in a portion of the current data transmission.

The piggyback request may be included in the current data transmission in various ways. For example, the piggyback request may be part of a header in the current data transmission. In one implementation, the piggyback request comprises a request count in the header of the current data transmission.

In one embodiment of the invention, a piggyback request may serve as an initial request for the subsequent data transmission. For example, the piggyback request may be the only request sent from the access node for requesting assignment of a scheduled transmission segment for the subsequent data transmission. In this case, there is no separate request signal sent in the request signal space for the subsequent data transmission. That is, the subsequent data transmission relies on the piggyback request to obtain an assignment of an appropriate scheduled transmission segment.

The access node may make a burst time decision to select between using a piggyback request versus using a symbol-level request in the request signal space, according to an embodiment of the invention. The burst time decision occurs around the time when the current data transmission is about to be sent. The selection may be based on the expected latency of the current data transmission. The selection may also be based on certain quality-of-service (QOS) considerations associated with the data transmission to be scheduled, i.e., the subsequent data transmission. Just as a simple example, a particular QOS requirement for the subsequent data transmission may be that requests are to be sent in less than 100 msec. If the expected latency of the current data transmission exceeds 100 msec, the access node may choose to use a symbol-level-request in the request signal space, instead of the piggyback request.

In one embodiment of the invention, a piggyback request may serve as a redundant request corresponding to a previously sent request. Here, each access node sends not only (1) a request in the request signal space, but also (2) a redundant piggyback request in the scheduled transmission signal space. The piggyback request may include a location identifier for the associated request in the request signal space. Thus, each request sent by an access node in the request signal space has a back up in the form of an associated redundant piggyback request.

One use of such redundant piggyback requests is detection of collisions between multiple requests in a request segment. Different nodes such as access nodes 104, 106, 108, and 110, may send requests in the same request segment in the request signal space, causing a collision. If each access node also sends an associated redundant piggyback request as backup, the redundant requests may be processed to detect the collision. Another use of such redundant piggyback request is for detection of missed requests.

FIG. 16 depicts use of piggyback requests for request collision detection and missed request processing, according to an embodiment of the invention. The figure shows possible events at a node such as scheduler node 102, and corresponding action taken.

First, upon receiving a request in the request signal space, scheduler 102 assigns a scheduled transmission segment to the request. Second, upon receiving a single (sole) piggyback request associated with a particular request detected in the request signal space, scheduler 102 ignores the piggy back request. Here, receipt of a single piggyback request indicates that only one access node sent the request in the request signal space, and thus no collision occurred. Third, upon receiving multiple piggyback requests associated with a particular request detected in the request signal space, scheduler 102 assigns a separate scheduled transmission segment to each piggyback request. Here, receipt of multiple piggyback requests that are all associated with the same request detected in the request signal space indicates that more than one of the access nodes sent the request, and thus a collision occurred. Thus, scheduler node 102 resolves the conflict by assigning each piggyback request a separate scheduled transmission segment. Fourth, upon receiving a piggyback request for an undetected request in the request signal space, scheduler 102 assigns a scheduled transmission segment to the piggyback request. Here, the piggyback request is associated with a request that was sent in the request signal space, but somehow was not detected. Here, the piggyback request serves its purpose as the backup request. Accordingly scheduler 102 assigns a scheduled transmission segment to the piggyback request.

Dynamic Partitioning of Request Signal Space and Scheduled Transmission Signal Space According to an embodiment of the present invention, the allocation of the shared communication medium between the request signal space and the scheduled transmission signal space can be dynamically altered. Just as a simple example, a system may dynamically alter the allocation of the shared communication medium, from an allocation as illustrated in FIG. 5, to an allocation as illustrated in FIG. 6. As discussed previously, FIG. 5 depicts a particular allocation of the shared communication medium based on frames of TDM time slots. FIG. 6 depicts a different allocation of the shared communication medium, also based on frames of TDM time slots. During operation, a system may dynamically switch from the allocation shown FIG. 5 to the allocation shown in FIG. 6. A node such as schedule node 102 may broadcast one or more control messages to other nodes such as access nodes 104, 106, 108, and 110 in order to notify them of the change in the allocation. Once the other nodes have been notified of the change, the system can switch over to operation according to the new allocation of the shared communication medium.

Two-Step Request Occupying Request Segment and Scheduled Transmission Segment

According to an embodiment of the invention, access nodes 104, 106, 108, and 110 may send a two-step request for transmission. Such a two-step request is made up of a first step and a second step. The first step may simply be a symbol-level request sent from the access node, as described previously. When an assignment is obtained associating the symbol-level request to a scheduled transmission segment, the access node can send a data transmission in the scheduled transmission segment. Here, the second step may be the data transmission sent in the scheduled transmission segment. In other words, instead of using the scheduled transmission segment assigned to a request for sending regular data, the access node uses the scheduled transmission segment to send the second step of the request. The second step may further define the request. The request may be a more elaborate request for service. For example, the second step may specify a particular service type or other information that provides additional details on the request being made.

Multiple Requests for Priority Access

According to an embodiment of the invention, an access node such as 104, 106, 108, and 110 may send more than one request when attempting to obtain an assignment to schedule only one data transmission. Ordinarily, when the access node has a data transmission to send, the access node sends one request in order to obtain an assignment for a scheduled transmission segment. Here, however, the access node may send out two or more requests. In other words, the access node may send an extra request(s) as backup. This may be done for the purpose of increasing the likelihood of an assignment. For example, if scheduler 102 somehow fails to detect one of the requests, the other request(s) may still be detected. For each detected request, scheduler 102 may send an assignment that assigns the detected request to a scheduled transmission segment.

Of course, this can lead to multiple assignments of separate scheduled transmission segments, reserved for just one data transmission. According to one embodiment of the invention, the access node does not waste such extra scheduled transmission segments. Instead, the access node utilizes such extra scheduled transmission segment for sending other data transmissions.

No Scheduler Mode and Other Assignment Modes

Different assignment modes may be adopted according to various embodiments of the invention. These may include a "scheduler mode," a "no scheduler mode," and a "hybrid mode." Here, a "scheduler mode" refers to a mode of operation in which access nodes rely on a scheduler node to determine the assignment of scheduled transmission segments. Previous sections have described examples under the "scheduler mode."

Figure 17:
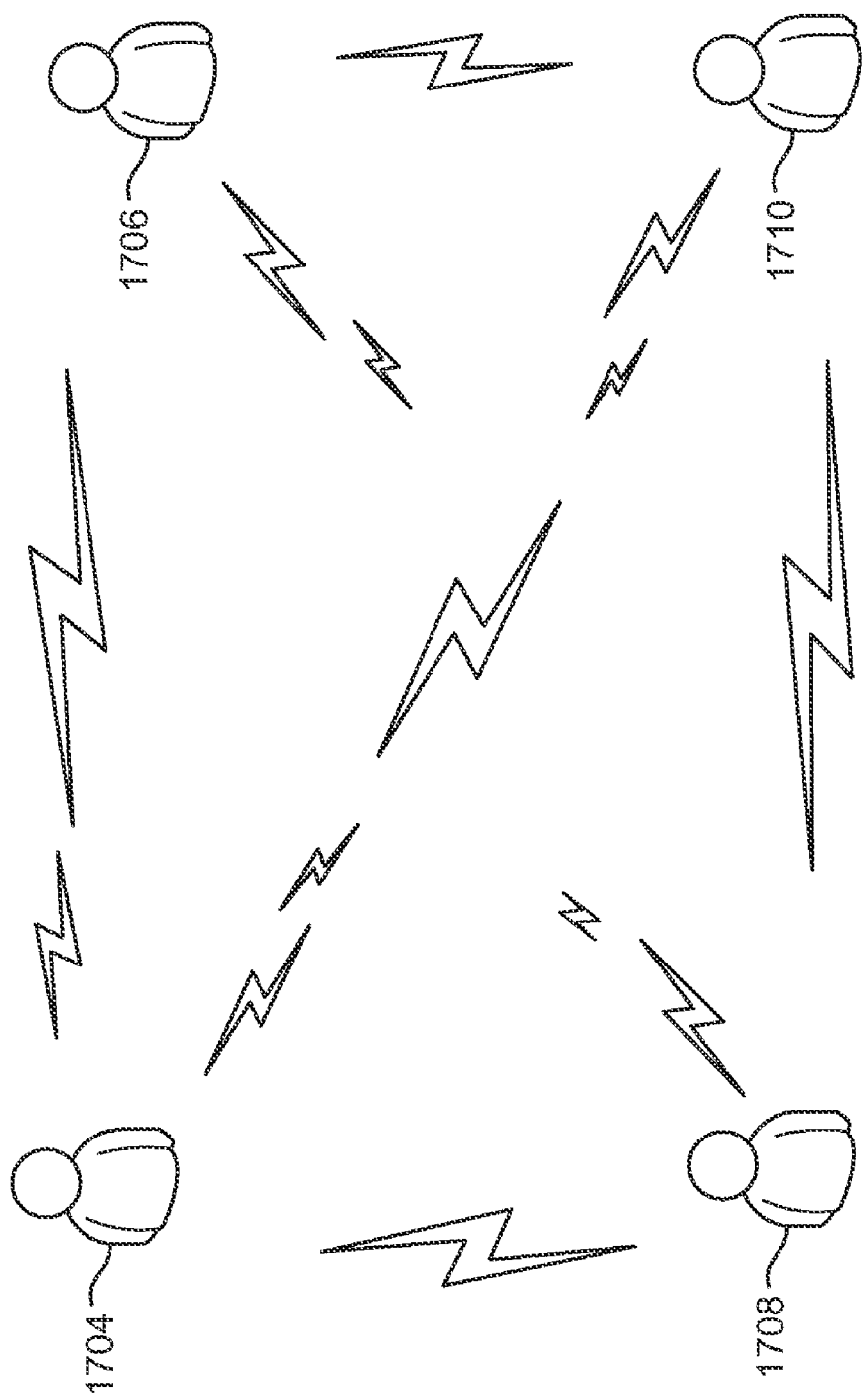
FIG. 17 presents a simplified network operating under a "no scheduler mode," according to one embodiment of the invention.

FIG. 17 presents a simplified network operating under a "no scheduler mode," according to one embodiment of the invention. A plurality of access nodes 1404, 1406, 1408, and 1410 are shown that utilize a shared communication medium. Instead of depending on a scheduler node to receive requests and determine the proper assignment of scheduled transmission segments, each access node 1404, 1406, 1408, and 1410 independently determines the proper assignment of scheduled transmission segments. Here, it is assumed that all access nodes follow the same rules for determining assignments, and all access nodes can detect all requests. If this is the case, then the same assignment of scheduled transmission segments would be generated at each access node. That is, each access node would independently generate the same assignment. As such, there would be no need for a dedicated scheduler node. Also, there would be no need for assignment messages to be sent. Each access node would be able to locally determine the proper assignment on its own. Consequently, a feedback signal space may not need to be provided for sending any assignment messages.

A "hybrid mode" is described below in accordance with another embodiment. Referring back to FIG. 1, under this mode, each access node such as 104, 106, 108, and 110 receives both (1) assignment messages from a scheduler node such as 102 and (2) requests from the other access nodes. Here, each access node does independently determine the proper assignment of scheduled transmission segments based on requests received from other nodes. However, in making the determination, the access node also takes into account the assignment messages received from the scheduler node. By utilizing both sources of information, each access node can make a more robust determination regarding what is the proper assignment of scheduled transmission segments.

According to yet another embodiment of the invention, a system may contain a mixture of access nodes operating under different assignment modes. Some of the access nodes in the system may operate under a "scheduler mode." Some of the access nodes in the system may operate under a "no scheduler mode," as discussed above. Finally, some of the access nodes in the system may operate under a "hybrid mode, as discussed above.

While the present invention has been described in terms of specific embodiments, it should be apparent to those skilled in the art that the scope of the present invention is not limited to the described specific embodiments. The specification and drawings are, accordingly, to be regarded in an illustrative rather than a restrictive sense. It will, however, be evident that additions, subtractions, substitutions, and other modifications may be made without departing from the broader spirit and scope of the invention as set forth in the claims.

What is claimed is:

1. A method for conducting communications over a shared communication medium involving a plurality of nodes, the method comprising:
   (a) sending a request to a scheduler from a first node in the plurality of nodes, the shared communication medium organized to include a request signal space having at least one frame and a scheduled transmission signal space, the request signal space including a plurality of request segments each having a different location defined within the at least one frame within the request signal space, the scheduled transmission signal space including a plurality of scheduled transmission segments each having a different location within the scheduled transmission signal space, the request sent in a request segment that is one of the plurality of request segments;
   (b) at the first node, obtaining an assignment from the scheduler associating the request with a scheduled transmission segment selected from the plurality of scheduled transmission segments, the assignment taking into account location of the request within the request signal space;
   (c) from the first node, sending a data transmission in the scheduled transmission segment associated with the request in accordance with the assignment; and
   (d) wherein the plurality of scheduled transmission segments include multiple categories of scheduled transmission segments associated with different service types, and wherein the request is for transmission in a particular category of scheduled transmission segments associated with a particular service type.

2. The method of claim 1 wherein the plurality of request segments include multiple categories of requests segments, and wherein each category of request segments is used for requesting transmission in a particular category of scheduled transmission segments associated with a particular service type.

3. The method of claim 2 wherein the request comprises 1 symbol in the request signal space.

4. The method of claim 1 wherein the request comprises N symbols sent in the request signal space, N being a positive integer greater than zero.

5. The method of claim 4 wherein the N symbols of the request are non-coherently detected.

6. The method of claim 5 wherein the N symbols of the request specifies one out of $2^N-1$ service types.

7. The method of claim 4 wherein the N symbols of the request are coherently detected.

8. The method of claim 7 wherein the N symbols of the request are modulated according to a modulation scheme.

9. The method of claim 8 wherein the modulation scheme is an M-ary differential phase shift keying (M-DPSK) modulation scheme.

10. The method of claim 9 wherein the N symbols of the request specifies one out of $M^{N-1}$ service types where M is greater than zero.

11. The method of claim 7 wherein the N symbols of the request are coded according to a coding scheme.

12. The method of claim 11 wherein the coding scheme is a block coding scheme.

13. A method for conducting communications over a shared communication medium involving a plurality of nodes including a first node and a second node, the method comprising:
   (a) at the second node, receiving a request from the first node, the shared communication medium organized to include a request signal space having at least one frame and a scheduled transmission signal space, the request signal space including a plurality of request segments each having a different location defined within the at least one frame within the request signal space, the scheduled transmission signal space including a plurality of scheduled transmission segments each having a different location within the scheduled transmission signal space, the request sent in a request segment that is one of the plurality of request segments;

(b) at the second node, making an assignment associating the request with a scheduled transmission segment selected from the plurality of scheduled transmission segments, the assignment taking into account location of the request within the request signal space, and sending a corresponding assignment message;

(c) at the second node, receiving a data transmission from the first node in the scheduled transmission segment associated with the request; and (d) wherein the plurality of scheduled transmission segments include multiple categories of scheduled transmission segments associated with different service types, and wherein the request is for transmission in a particular category of scheduled transmission segments associated with a particular service type.

14. An apparatus for conducting communications over a shared communication medium involving a plurality of nodes, comprising:

(a) a first node configured to send a request to a scheduler over the shared communication medium, the shared communication medium organized to include a request signal space having at least one frame and a scheduled transmission signal space, the request signal space including a plurality of request segments each having a different location defined within the at least one frame within the request signal space, the scheduled transmission signal space including a plurality of scheduled transmission segments each having a different location within the scheduled transmission signal space, the first node configured to send the request in a request segment that is one of the plurality of request segments;

(b) wherein the first node is configured to obtain an assignment from the scheduler associating the request with a scheduled transmission segment selected from the plurality of scheduled transmission segments, the assignment taking into account location of the request within the request signal space;

(c) wherein the first node is configured to send a data transmission in the scheduled transmission segment associated with the request in accordance with the assignment; and (d) wherein the plurality of scheduled transmission segments include multiple categories of scheduled transmission segments associated with different service types, and wherein the request is for transmission in a particular category of scheduled transmission segments associated with a particular service type.

15. The apparatus of claim 14 wherein the plurality of request segments include multiple categories of requests segments, and wherein each category of request segments is used for requesting transmission in a particular category of scheduled transmission segments associated with a particular service type.

16. The apparatus of claim 15 wherein the request comprises 1 symbol in the request signal space.

17. The apparatus of claim 14 wherein the request comprises N symbols sent in the request signal space, N being a positive integer greater than zero.

18. The apparatus of claim 17 wherein the N symbols of the request are non-coherently detected.

19. The apparatus of claim 18 wherein the N symbols of the request specifies one out of $2^N-1$ service types.

20. The apparatus of claim 17 wherein the N symbols of the request are coherently detected.

21. The apparatus of claim 20 wherein the N symbols of the request are modulated according to a modulation scheme.

22. The apparatus of claim 21 wherein the modulation scheme is an M-ary differential phase shift keying (M-DPSK) modulation scheme.

23. The apparatus of claim 22 wherein the N symbols of the request specifies one out of $M^{N-1}$ servicetypes where M is greater than zero.

24. The apparatus of claim 20 wherein the N symbols of the request are coded according to a coding scheme.

25. The apparatus of claim 24 wherein the coding scheme is a block coding scheme.

26. An apparatus for conducting communications over a shared communication medium involving a plurality of nodes, comprising:

(a) a second node configured to receive a request from a first node, the shared communication medium organized to include a request signal space having at least one frame and a scheduled transmission signal space, the request signal space including a plurality of request segments each having a different location defined within the at least one frame within the request signal space, the scheduled transmission signal space including a plurality of scheduled transmission segments each having a different location within the scheduled transmission signal space, the second node configured to receive the request in a request segment that is one of the plurality of request segments;

(b) wherein the second node is configured to make an assignment associating the request with a scheduled transmission segment selected from the plurality of scheduled transmission segments, the assignment taking into account location of the request within the request signal space, and sending a corresponding assignment message;

(c) wherein the second node is configured to receive a data transmission from the first node in the scheduled transmission segment associated with the request; and (d) wherein the plurality of scheduled transmission segments include multiple categories of scheduled transmission segments associated with different service types, and wherein the request is for transmission in a particular category of scheduled transmission segments associated with a particular service type.

* * * * *